(12) United States Patent
O'Brien et al.

(10) Patent No.: US 11,074,621 B2
(45) Date of Patent: Jul. 27, 2021

(54) DEAL ALLOCATION PLATFORM

(71) Applicant: Groupon, Inc., Chicago, IL (US)

(72) Inventors: Sean O'Brien, Fremont, CA (US);
Mark Daly, San Francisco, CA (US);
Ramkumar Rajendran, Santa Clara, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 16/154,089

(22) Filed: Oct. 8, 2018

(65) Prior Publication Data

US 2019/0213642 A1 Jul. 11, 2019

Related U.S. Application Data

(63) Continuation of application No. 13/838,918, filed on Mar. 15, 2013, now Pat. No. 10,115,129.

(60) Provisional application No. 61/613,476, filed on Mar. 20, 2012.

(51) Int. Cl.
*G06Q 30/02* (2012.01)
(52) U.S. Cl.
CPC ................ *G06Q 30/0269* (2013.01)
(58) Field of Classification Search
CPC .................................................. G06Q 30/0269

USPC ...................................................... 705/14.66
See application file for complete search history.

(56) References Cited

U.S. PATENT DOCUMENTS

| 6,567,786 | B1 * | 5/2003 | Bibelnieks | ............ G06Q 30/02 |
| | | | | 705/14.44 |
| 7,991,651 | B2 | 8/2011 | Hanks et al. | |
| 2002/0169654 | A1 | 11/2002 | Santos et al. | |
| 2007/0022003 | A1 * | 1/2007 | Chao | .................. G06Q 30/0201 |
| | | | | 705/14.46 |
| 2007/0055570 | A1 * | 3/2007 | Martin | .................. G06Q 30/02 |
| | | | | 705/14.41 |
| 2010/0180232 | A1 * | 7/2010 | Honan | .................. G06Q 30/02 |
| | | | | 715/811 |

OTHER PUBLICATIONS

U.S. Application filed Mar. 2, 2012; first named inventor: O'Brien, U.S. Appl. No. 13/411,502.

* cited by examiner

*Primary Examiner* — Azam A Ansari
(74) *Attorney, Agent, or Firm* — Alston & Bird LLP

(57) ABSTRACT

A deal allocation platform is disclosed. The deal allocation platform may be configured to be used in multiple contexts, such as, for example, a batch processing context and a real-time context. Further, the deal allocation platform may be configured to reallocate users assigned to deals based on an approximation of a global optimization problem. In addition, the deal allocation platform may enable configuration of one or multiple experiments.

21 Claims, 22 Drawing Sheets

Sharding

| | Organic Placements | Per shard min | Post balancing Placements |
|---|---|---|---|
| Shard 1 (50%) | | 5k | |
| Shard 2 (50%) | | 5k | |
| Total | | 10k | |

First approach:

Each shard should have a min proportional to its size

Sharding (cont.)

| | Organic Placements | Per shard min | Post balancing Placements |
|---|---|---|---|
| Shard 1 (40%) | 2k | 4k | 4k |
| Shard 2 (60%) | 7k | 6k | 7k |
| Total | 9k | 10k | 11k |

First approach:

Each shard should have a min proportional to its size

Sharding (cont.)

| | Organic Placements | Per shard min | Post balancing Placements |
|---|---|---|---|
| Shard 1 (50%) | 3k | 3k + 500 | 3500 |
| Shard 2 (50%) | 6k | 5k + 500 | 5500 |
| Total | 9k | 10k | 10k |

More fair approach:
Split the discrepancy

DEAL ALLOCATION PLATFORM

REFERENCE TO RELATED APPLICATION

This application is a continuation and claims the priority benefit of United States of America patent application Ser. No. 13/838,918 filed Mar. 15, 2013 and claims the benefit of U.S. Provisional Application No. 61/613,476, filed Mar. 20, 2012, the entirety of which is hereby incorporated by reference herein.

TECHNICAL FIELD

The present description relates to offering promotions or deals associated with a product or a service. This description more specifically relates to deal allocation platform for determining which promotion(s) or deal(s) to offer for a product or a service.

BACKGROUND

Merchants typically offer promotions to consumers. The promotions offered may be in the form of discounts, rewards, or the like. When offering the promotions, a merchant may seek to focus the offer to a subset of its consumers. In order to select those consumers in the subset, the merchant may analyze data generated from similar promotions. However, the analysis to determine which promotion(s) or deal(s) to offer to the consumer for a product or a service may prove difficult.

SUMMARY

A deal allocation platform is disclosed.

In one aspect, a method is provided for determining whether to offer a promotion to one or more consumers. The method includes: accessing, from disparate sources, consumer data for the one or more consumers and merchant data; joining the accessed consumer data and merchant data into a defined consumer data unit so that each consumer is assigned a respective consumer data unit that includes the consumer data and the merchant data from the disparate sources; partitioning functions used to determine whether to offer the promotion to the one or more consumers to worker nodes in a computing system; collecting answers from the worker nodes; and combining the answers in order to determine which of the one or more consumers to offer the promotion to.

In another aspect, a system is provided for determining whether to offer a promotion to one or more consumers. The system includes: a memory storing processor-executable instructions; and a processor in communication with the memory. The processor is configured to execute the processor-executable instructions to: access, from disparate sources, consumer data for the one or more consumers and merchant data; join the accessed consumer data and merchant data into a defined consumer data unit so that each consumer is assigned a respective consumer data unit that includes the consumer data and the merchant data from the disparate sources; partition functions used to determine whether to offer the promotion to the one or more consumers to worker nodes in a computing system; collect answers from the worker nodes; and combine the answers in order to determine which of the one or more consumers to offer the promotion to.

In still another aspect, a method is provided of reallocating one or more consumers for presentation of one or more deals. The method includes: determining to present one or more deals to consumers; determining that one or more consumers are to be reallocated; analyzing, using a cost function, costs associated with reallocating or not reallocating the one or more consumers; and reallocating the one or more consumers based on analyzing the cost function.

In yet another aspect, a system is provided of reallocating one or more consumers for presentation of one or more deals. The system includes: a memory storing processor-executable instructions; and a processor in communication with the memory. The processor is configured to execute the processor-executable instructions to: determine to present one or more deals to consumers; determine that one or more consumers are to be reallocated; analyze, using a cost function, costs associated with reallocating or not reallocating the one or more consumers; and reallocate the one or more consumers based on analyzing the cost function.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The deal allocation platform may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
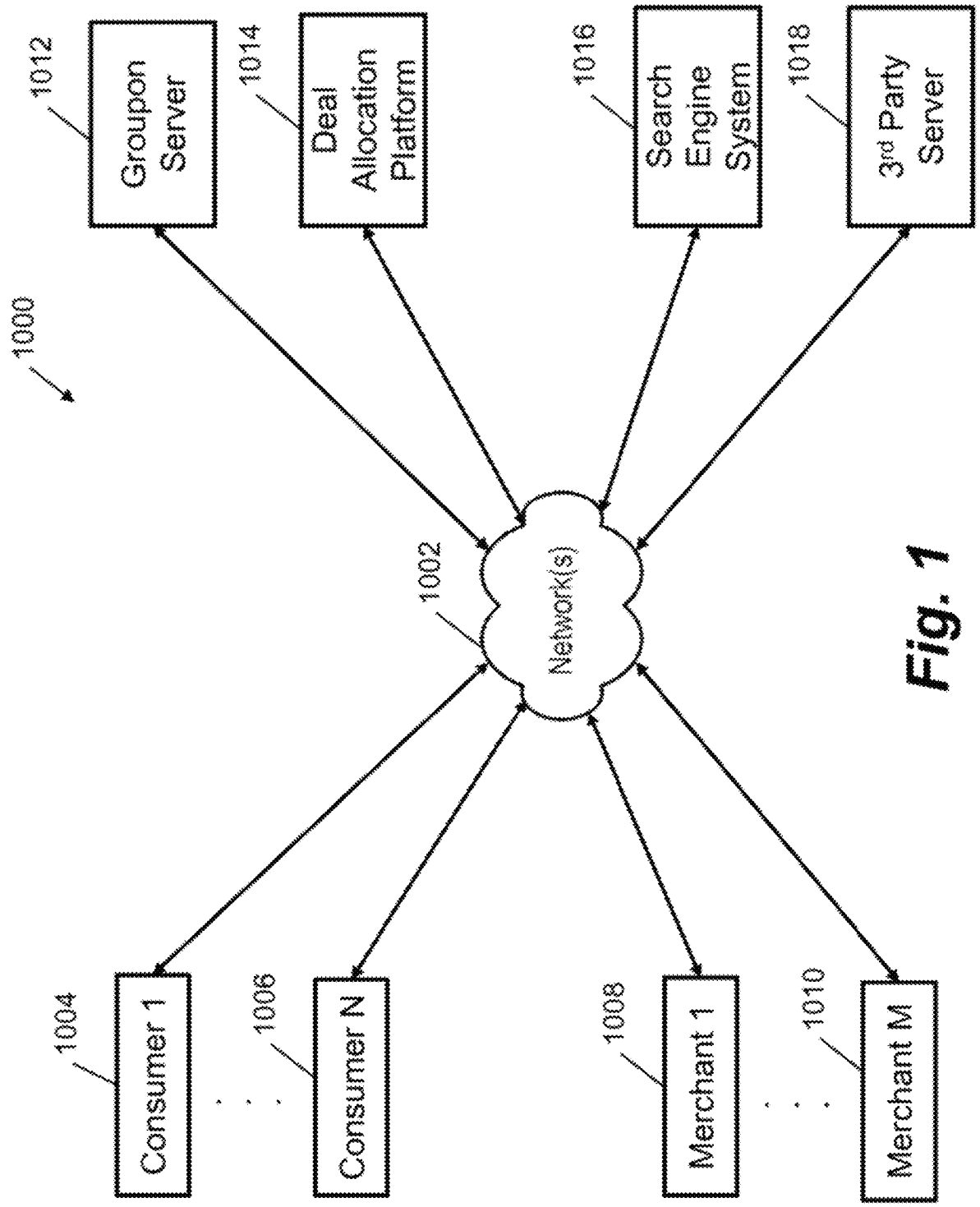
FIG. 1 shows a representation of a network and a plurality of devices that interact with the network, including a deal allocation platform.

FIG. 1 illustrates a network architecture for a retailing system that includes deal allocation platform 1014 and network 1002. The network 1002 may include one or more wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

Deal allocation platform 1014 communicates with a variety of devices include consumer devices, merchant devices, servers (including servers that provide search engine capabilities and other website functionality). For example, one or more consumers, illustrated as Consumer 1 (1004) to Consumer N (1006), may communicate with network 1002. The consumers may use any type of electronic device, such as a mobile computing device (e.g., a smartphone), a palmtop computer, a laptop computer, a desktop computer, or the like. In addition, one or more merchants, illustrated as Merchant 1 (1008) to Merchant M (1010), may communicate with network 1002. The depiction in FIG. 1 of "N" consumers and "M" merchants is merely for illustration purposes.

FIG. 1 further illustrates servers, such as Groupon® server 1012 and $3^{rd}$ party server 1018, and network functionality, such as search engine system 1016. As illustrated in FIG. 1, deal allocation platform 1014 is depicted separately from Groupon® server 1012. Alternatively, deal allocation platform 1014 may be integrated with Groupon® server 1012.

Figure 2:
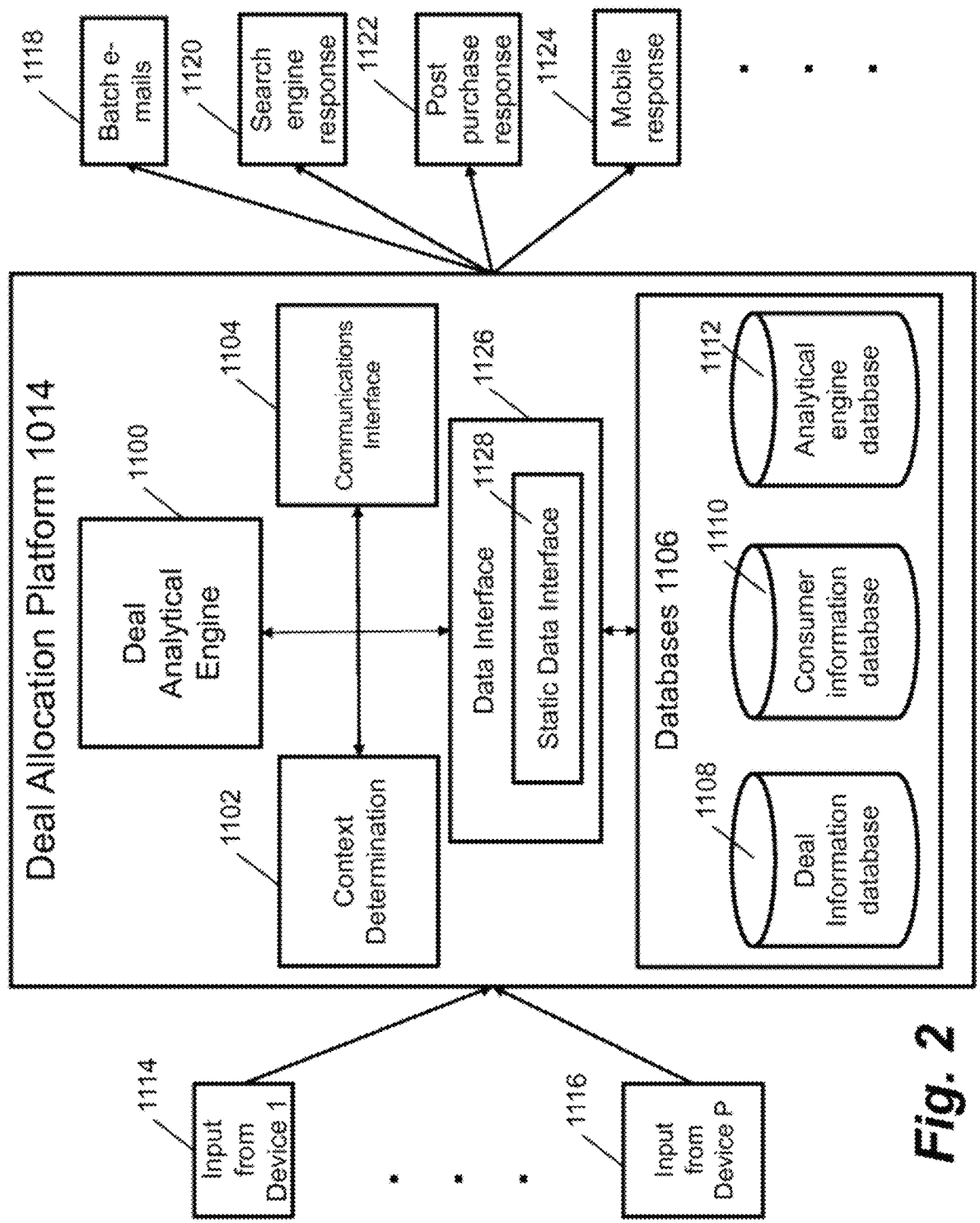
FIG. 2 shows a block diagram of the deal allocation platform.

FIG. 2 illustrates an expanded block diagram of deal allocation platform 1014. As illustrated in FIG. 2, deal allocation platform 1014 may receive inputs from one or more input devices, such as input from Device 1 (1114) to input from Device P (1116). Examples of input device include, but are not limited to input from Groupon® server 1012, search engine system 1016, $3^{rd}$ party server 1018, consumer 1 (1004) to consumer N (1006).

As shown in FIG. 2, deal allocation platform 1014 includes deal analytical engine 1100, context determination 1102, communications interface 1104, data interface 1126, and databases 1106. In one embodiment, deal allocation platform 1014 may optionally use context determination 1102 in order to process multiple workflows depending on the context. As shown in FIG. 2, context determination 1102 is separate from deal analytical engine 1100, and may be used to control the flow of the various workflows. Alternatively, context determination 1102 may be integrated with deal analytical engine 1100.

As discussed in more detail below, data interface 1126 provides the interface between databases 1106 and other aspects of the deal allocation platform 1014, such as deal analytical engine 1100. Data interface 1126 is configured to abstract at least one aspect of the data, such as the source and/or format of the data, as discussed in more detail below.

The abstracted data may then be presented to another portion of the deal allocation platform 1014, such as the deal analytical engine 1100. In this way, the deal analytical engine 1100 may use the data after abstraction by the data interface 1126 regardless of the source of the data.

For example, data interface 1126 may abstract data from one or more of databases 1106. As another example, data interface may abstract data from Groupon® server 1012, search engine system 1016, and/or $3^{rd}$ party server 1018. Further, data interface 1126 may include functionality to abstract different types of data. In particular, data interface 1126 may include static data interface 1128, which is configured to abstract static data for use by deal analytical engine 1100. Static data interface 1128 is merely one example of the type of data that data interface 1126 may abstract. Other types of data are contemplated.

Further, as shown in FIG. 2, databases 1106 include deal information database 1108, consumer information database 1110, and analytical engine database 1112. The deal information database 1108 includes data related to the deals available for offer to consumers. Deals include, but are not limited to, any type of reward, discount, coupon, credit, voucher or the like used toward part (or all) of the purchase of a product or a service. The consumer information database 1110 includes data related to the consumers. And, the analytical engine database 1112 includes data (other than deal data and consumer data) that is used by the deal analytical engine 1100, such as the past purchase database. FIG. 2 depicts deal information database 1108, consumer information database 1110, and analytical engine database 1112 as separate databases. Alternatively, deal information database 1108, consumer information database 1110, and analytical engine database 1112 may be included in a single memory device.

Figure 3:
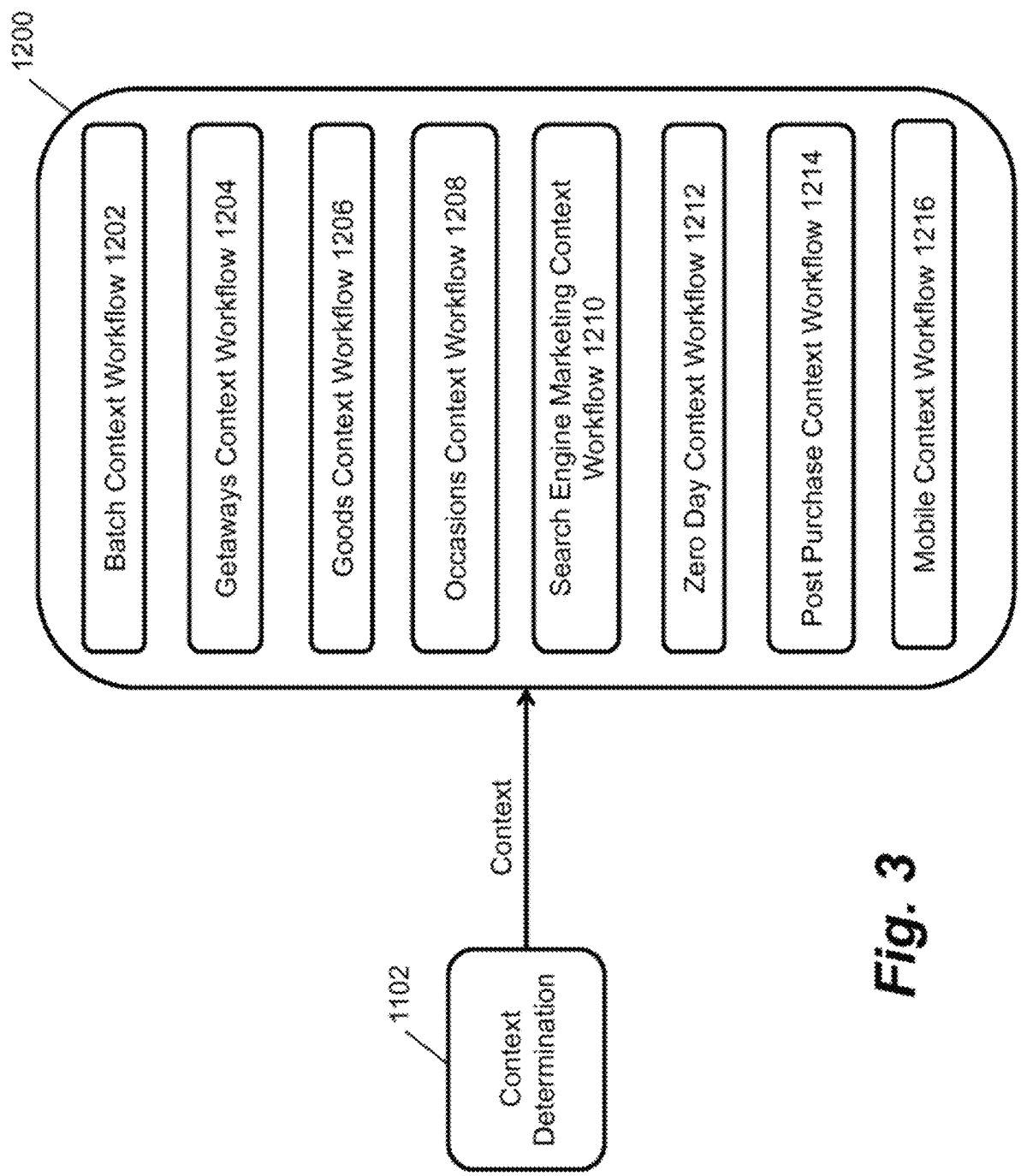
FIG. 3 shows a block diagram of the context determination and the different context workflows.

One example of context determination 1102 is illustrated in FIG. 3, in which the context determination 1102 determines which of the following workflows 1200 to execute including: batch context workflow 1202; getaways context workflow 1204, goods context workflow 1206, occasions context workflow 1208, search engine marketing context workflow 1210, zero day context workflow 1212, post purchase context workflow 1214, and mobile context workflow 1216. The workflows shown in FIG. 3 are merely for illustration purposes. Further, the workflows illustrated in FIG. 3 may use a single deal analytical engine 1100, which may be tailored to each of the specific contexts. Alternatively, one, some, or all of the workflows may have assigned to them a specific deal analytical engine.

The workflows vary from one another in at least one aspect. For example, batch context workflow 1202 relates to processing batch e-mails. The search engine marketing context workflow 1210 relates to processing an inquiry from a search engine. The workflows are discussed in more detail in U.S. application Ser. No. 13/411,502, filed on Mar. 2, 2012, entitled "Relevance System for Consumer Deals", which is incorporated by reference herein in its entirety.

Figure 4A:
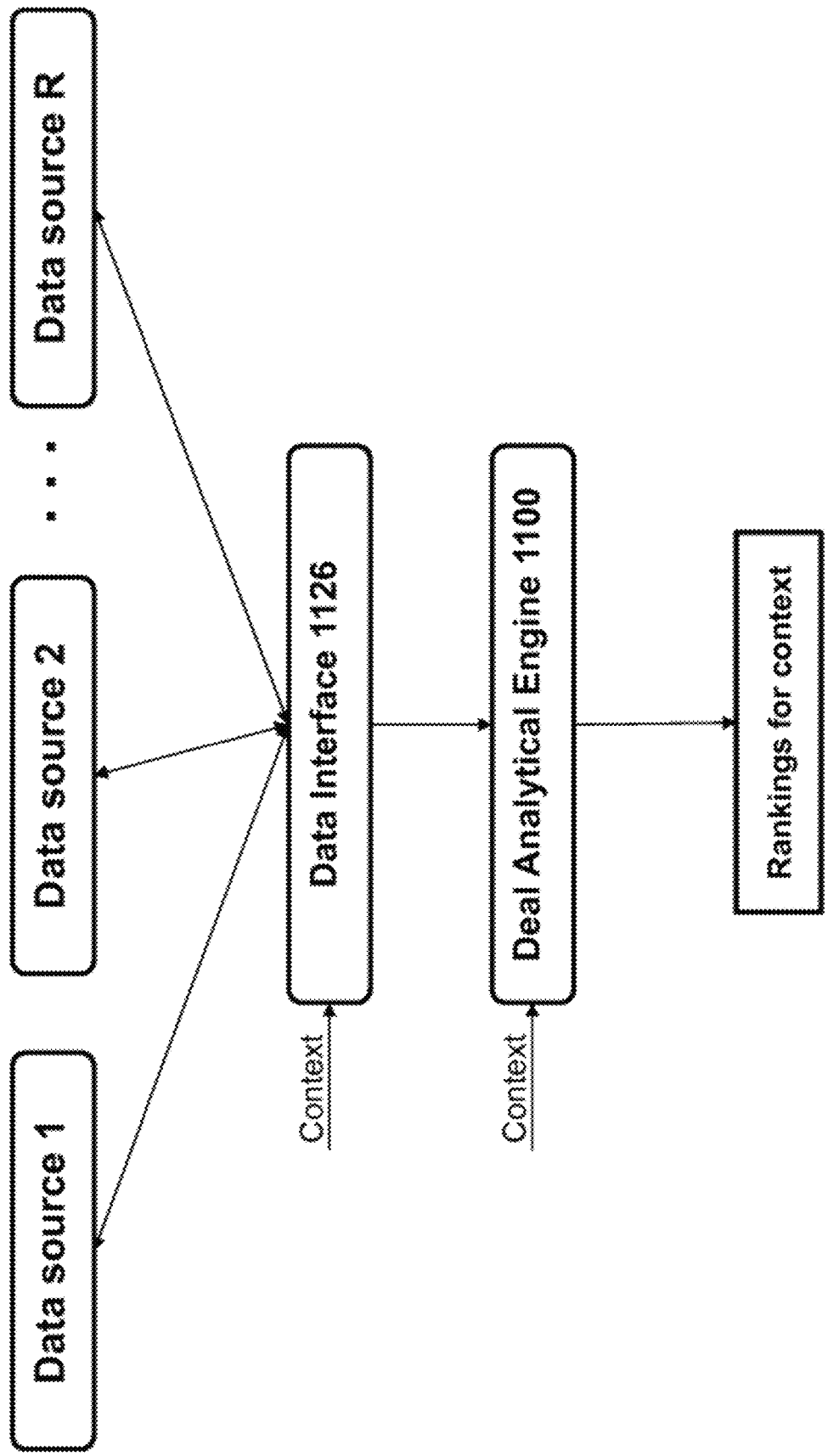
FIG. 4a shows a block diagram of one representation of the data interface and deal analytical engine.

FIG. 4a shows a block diagram of one representation of the data interface 1126 and deal analytical engine 1100. Data interface 1126 may communicate with multiple data sources, such as data source 1, data source 2, . . . data source R. Data interface 1126 may include a Data Serialization Model that is configured to cache data. In one example, data is cached to store data in plain old java objects (POJO's). The data is cached from one or more of data source 1 to data source R. Each data source is configured to: marshal data into/out of the chosen objects it uses (e.g., read a flat file and create objects, as discussed below); provide a mechanism to produce a cacheable version of its data (e.g., produce a Java Script Object Notation (JSON) cached version of objects that it can quickly deserialize at run time); and provide optimized access for common use cases (e.g., create lookup tables for data that is often looked up by some id).

With respect to marshaling, the data used by the deal analytical engine 1100 comes from one or multiple sources. For example, most of the core data for ranking, such as customer profiles and deal information, comes from SQL queries. Other data, such as customer purchase preferences or impression history, may come from another type of database query, such as a data warehouse query, or from third parties. The data source is configured to determine the best way to take the raw data and load it into the types of data objects it wants to return.

In this way, the data interface 1126 may work in combination with the data sources in order to help abstract away how data is being stored prior to use by deal analytical engine 1100. As part of the marshalling process, each data source may, for example, produce a serialized version of its data or assisting in loading data such as in a file in HDFS or a Berkeley DB.

Figure 4B:
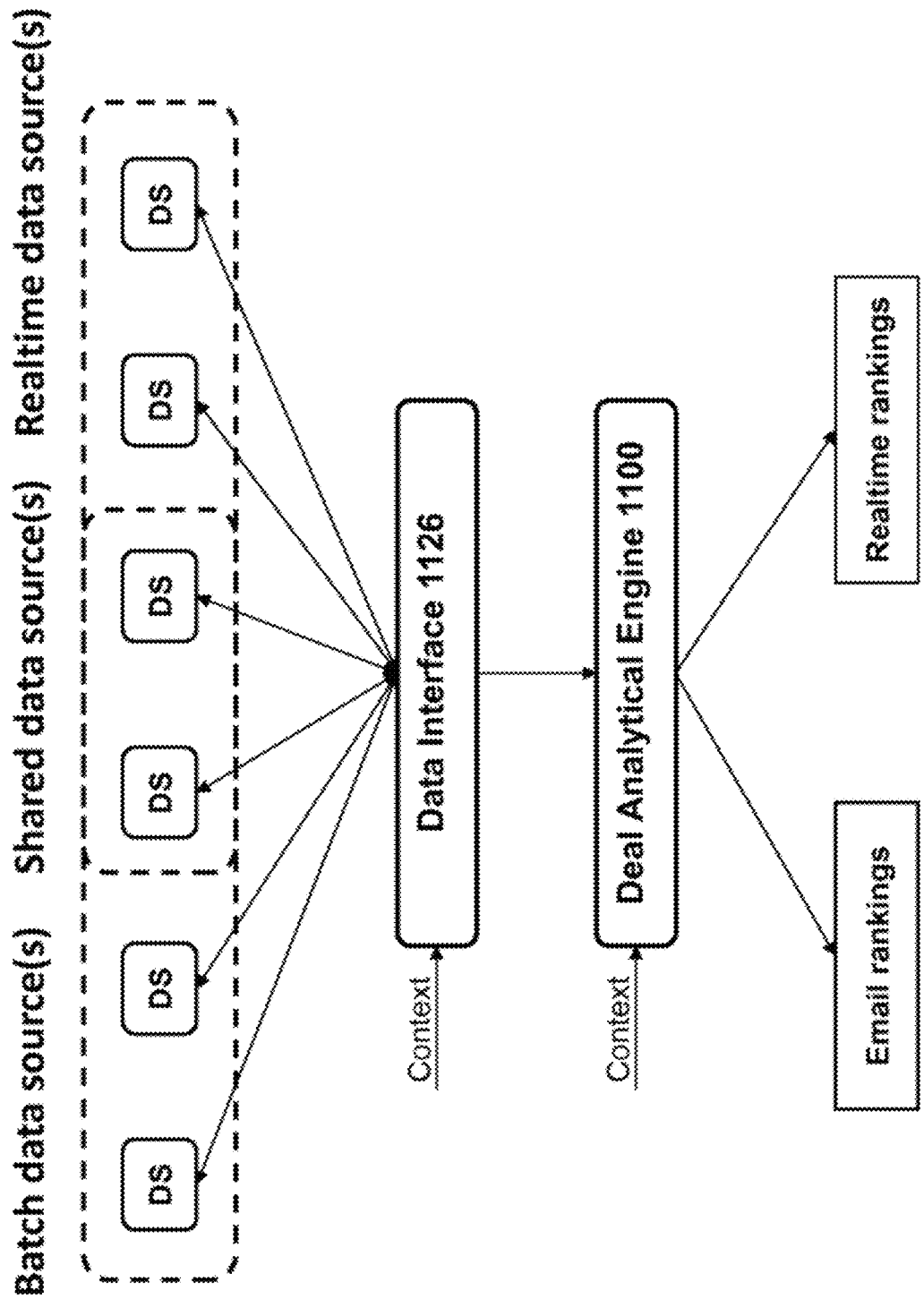
FIG. 4b shows a block diagram of another representation of the data interface and deal analytical engine in the context of batch processing and real-time processing.

FIG. 4b shows a block diagram of another representation of the data interface and deal analytical engine in the context of batch processing and real-time processing. In typical batch processing, data requests are handled one request at a time. In particular, queries are issued to different tables in a database or to a few different databases to obtain the different sections of data. The data interface 1126 interfaces with the different data sources in order to prepare the data for batch processing, such as obtaining and formatting the data for batch processing (e.g., configuring a file with one line of data for each of the consumers in the batch processing). In practice, the data interface 1126 may enable a data caching pipeline in which various data, such as consumer profile data, subscriber data, etc. are obtained from disparate sources and joined into a defined consumer data unit. A consumer data unit may include any unified record of data for a customer. So that, each consumer in the batch processing may have assigned a respective consumer data unit that includes data from the disparate sources. In turn, the consumer data units may be sent to one or more computers for batch processing.

In batch processing, the cached data may be divided into two distinct types: non-consumer cacheable data; and consumer cacheable data. Non-consumer cacheable data includes data that is used for all customers being calculated in a batch calculation. Examples include data regarding the set of deals available, driving distances, etc. In most cases, this means that the source of the data serializes an array of objects such as attributes associated with deals. In batch processing, the data environment may be passed a copy of all non-consumer cacheable data which it passes on to the respective datasources. Consumer cacheable data includes data that is used in the context of calculating a consumer's rankings. Consumer Cacheable data is similar to the non-consumer cacheable data except at a per customer level. Each source may produce one line of cached data per consumer with a common field userKey. Separate utilities combine all consumer cacheable data with the same userKey into one row. The final file of combined consumer data may be used as the input for the batch processing and on each call to the batch processing, the deal analytical engine 1100 may reset all per consumer data sources to use the row of data read for that map call.

Similarly, in the context of real-time processing, the data interface may configure the data into similar consumer data units. The data interface 1126 may then send the consumer data units to the deal analytical engine 1100 for processing.

Figure 5A:
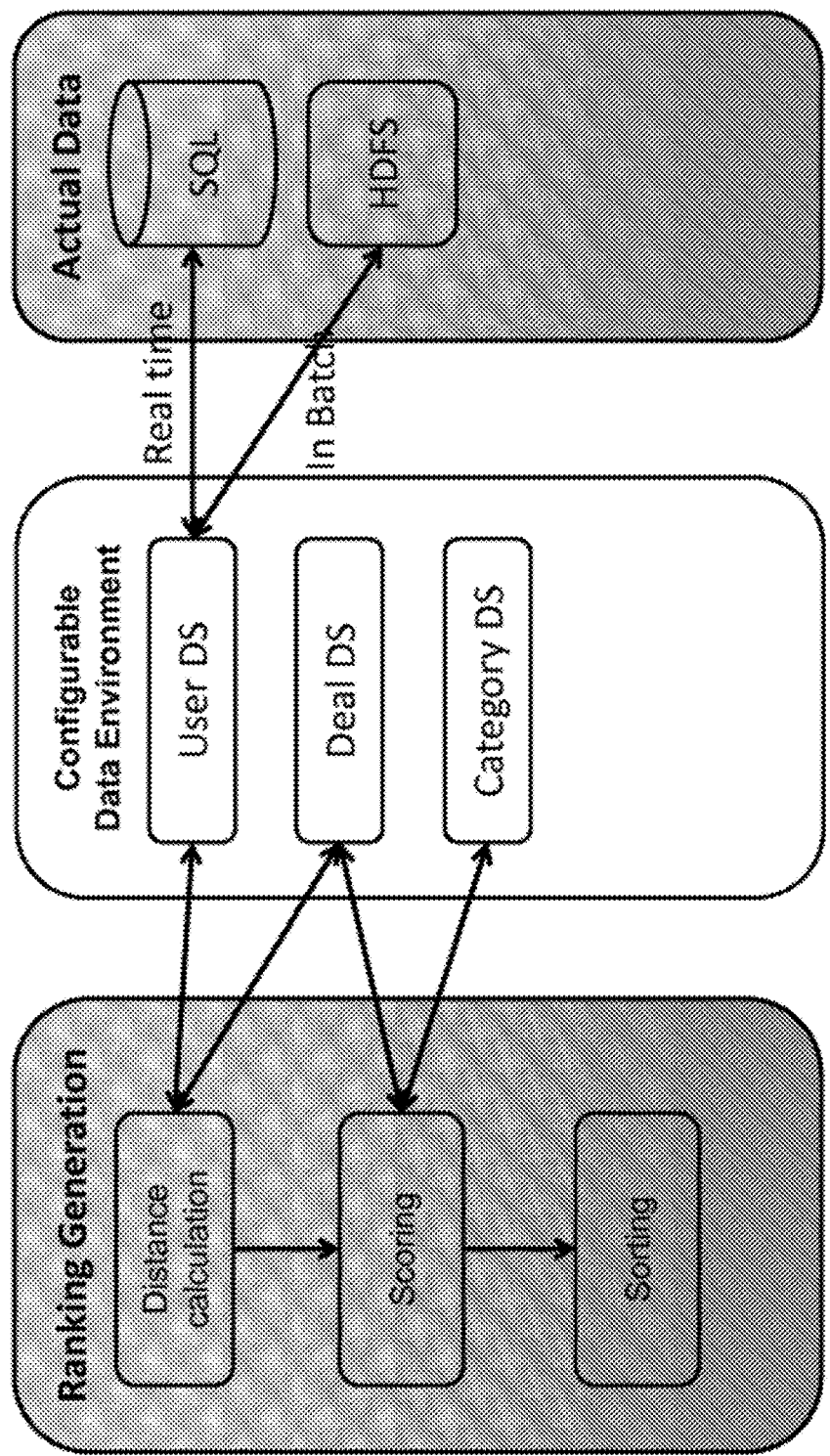
FIG. 5a illustrates a flow of data in which the origin of the data is hidden from the ranking generation.

FIG. 5a illustrates a flow of data in which the origin of the data is hidden from the ranking generation. Typically, when data is added to a ranking approach, a path needs to be created to load data (such as a custom pathway from the data to the deal analytical engine 1100). This may prove to be difficult when attempting to operate the deal analytical engine 1100 in different contexts, such as batch processing or real-time contexts. The abstraction of the data, such as illustrated in FIG. 5a, enables operators of the deal allocation platform to ignore how the data is being fetched, such that implementation of a methodology for a real-time context versus a batch processing context can simply use the data without concern for how or where the data was retrieved or fetched. So that, the retrieval mechanism is hidden while the data is exposed via a common interface. In this way, the common interface separates the content from the deal analytical engine 1100, thereby enabling re-use of the deal analytical engine 1100 for different contexts.

Figure 5B:
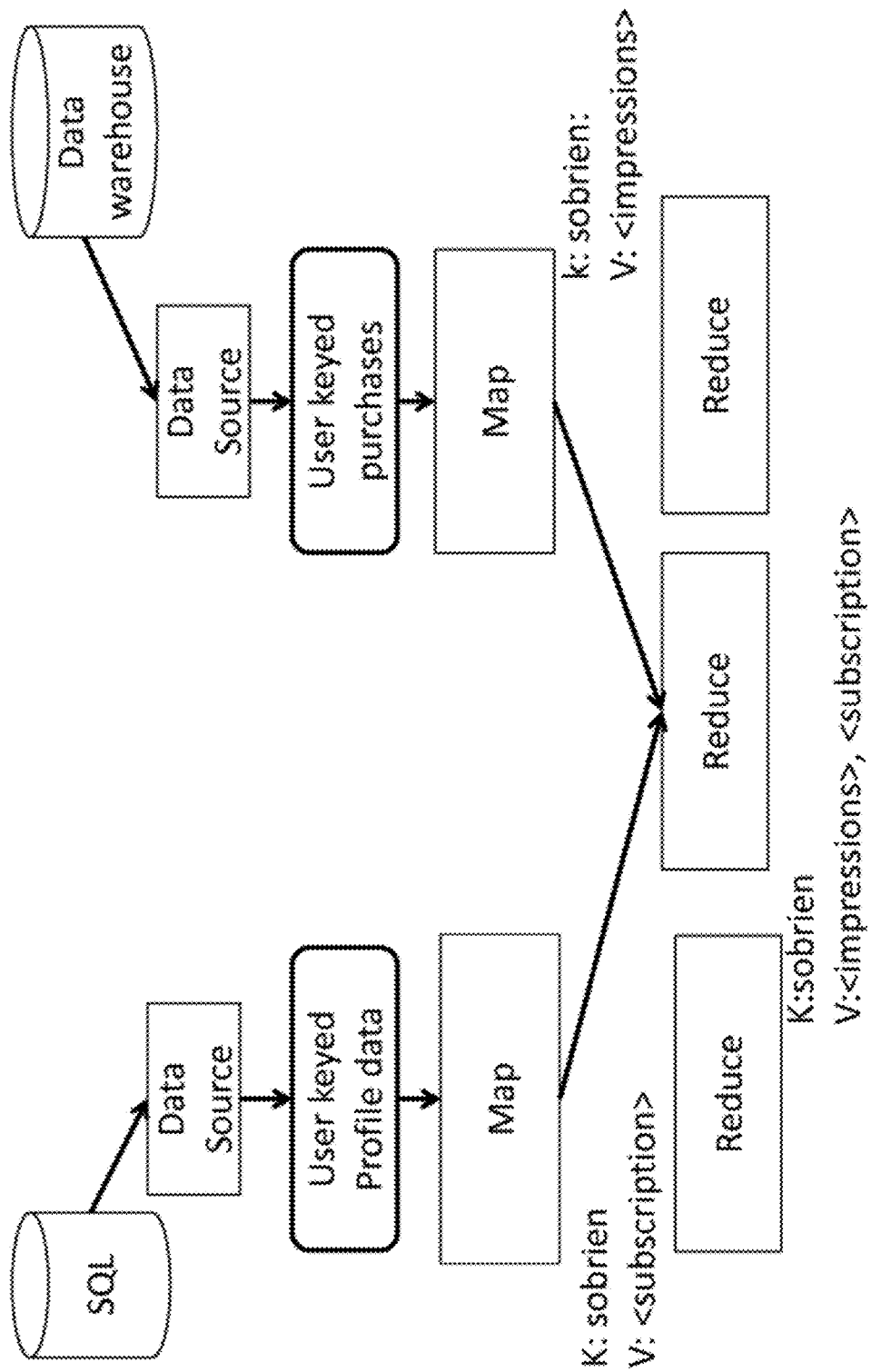
FIG. 5b illustrates the generic joining of data.

In one embodiment, the batch processing may be performed using distributed computing. One example of distributed computing is MapReduce, which supports distributed computing of large data sets on clusters of computers. In particular, MapReduce is a framework for processing highly distributable problems across huge datasets using a large number of computers (nodes), collectively referred to as a cluster (if all nodes use the same hardware) or a grid (if the nodes use different hardware). Computational processing can occur on data stored either in a filesystem (unstructured) or in a database (structured). With the "Map" step, the master node takes the input, partitions it up into smaller sub-problems, and distributes them to worker nodes. A worker node may do this again in turn, leading to a multi-level tree structure. The worker node processes the smaller problem, and passes the answer back to its master node. With the "Reduce" step, the master node then collects the answers to all the sub-problems and combines them in some way to form the output—the answer to the problem it was originally trying to solve. In the present context, FIG. 5b illustrates the steps by which to produce one unified record of data per customer when the data can come from a multitude of sources. In turn, the unified records of data may be used in MapReduce as outlined in FIG. 5b. Further, one or more lookup tables can be used such as key (K) and value (V), as shown in FIG. 5b.

Figure 6:
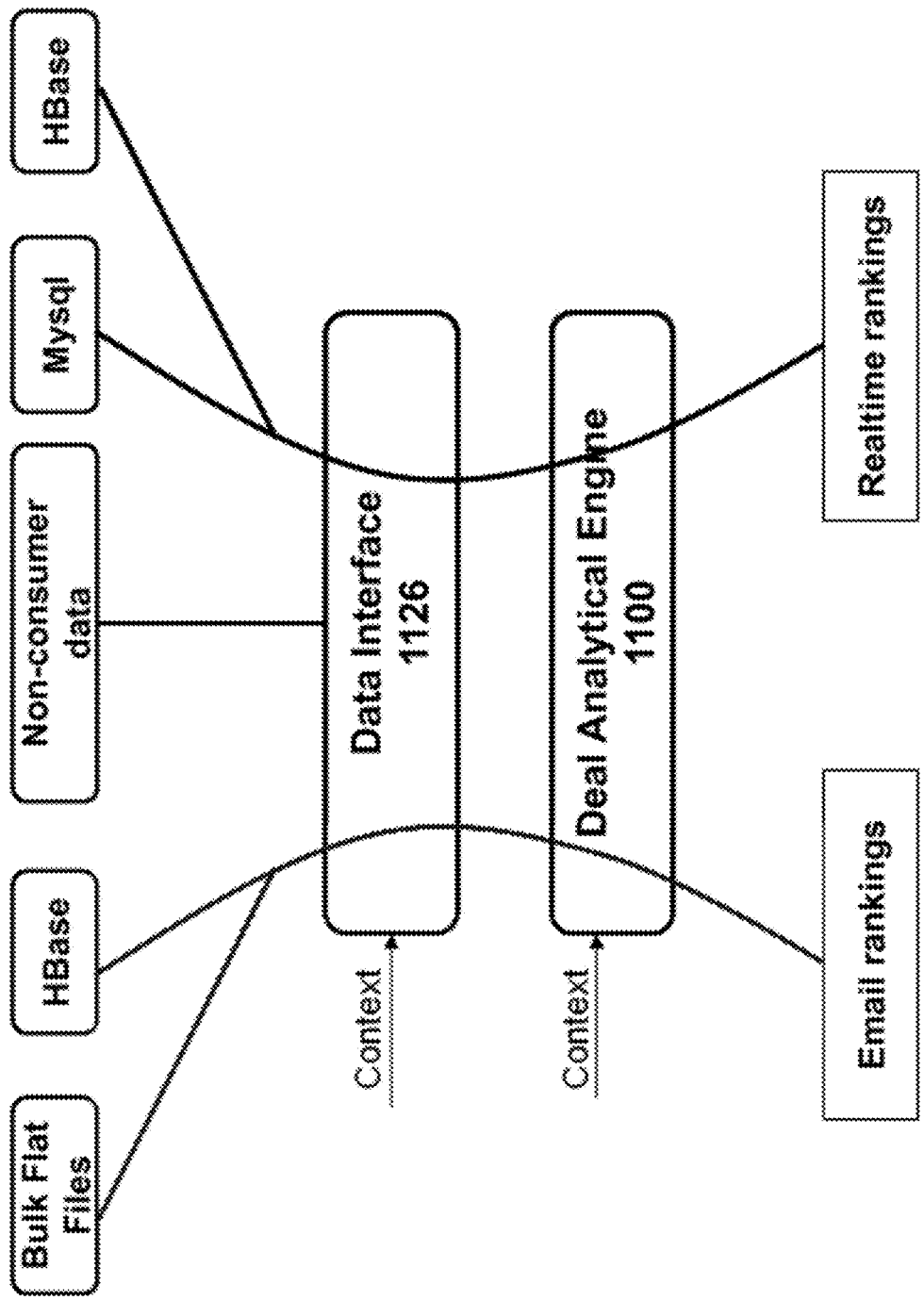
FIG. 6 shows a block diagram of the data flow in the context of batch processing and real-time processing.

FIG. 6 shows a block diagram of the data flow in the context of batch processing and real-time processing. In this way, the data is abstracted from the perspective of the deal analytical engine 1100.

Figure 7:
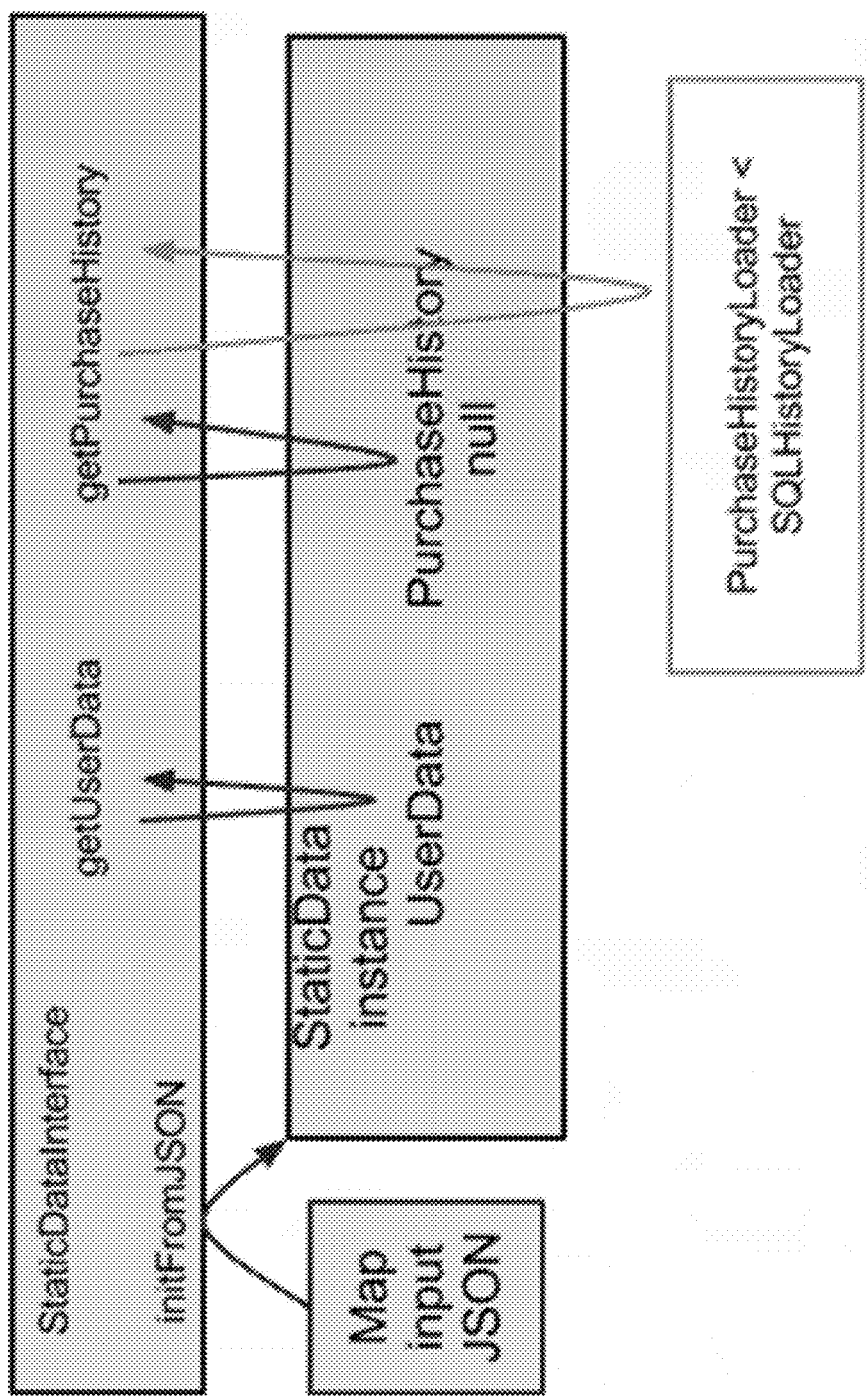
FIG. 7 is an example of the flow of data for processing by the data interface.

FIG. 7 is an example of the flow of data for processing by the data interface 1126. As discussed above, data interface 1126 may include static data interface 1128, which is configured to abstract static data. The static data is static from the perspective of the deal analytical engine 1100 in that the deal analytical engine 1100 does not change the static data. In this way, one of the design goals of this approach, to reduce or minimize the amount of mutable state in the engine, is satisfied, as mutation of data may cause bugs that are difficult to diagnose and resolve. However, the static data may be refreshed or updated periodically. Three examples types of static data include: (1) per consumer data; (2) shared static data; and (3) parameterized static data. Per consumer data includes the customer's location, gender, purchase history, etc. The system may find efficient ways to map over this type of data by joining per customer before running batch jobs. Shared static data includes data that is shared across all mappers as it is not customer specific. Shared static data may be data like driving distances, division properties, channel properties, scoring parameter data (which may be generated by offline processes and used to score deals based on their features), etc. Parameterized static data may in certain ways be viewed as a subset of shared static data. The primary difference, however, is that parameterized static data is stored once per calculation to ensure all mappers have exactly the same view of data and a given calculation can be reproduced. One example is the set of deals currently being calculated.

In order to enable that the static data works well for batch calculation and lookup or real-time calculations, the static data is abstracted. One example of the abstraction is illustrated in FIG. 7, in which the static data interface 1128 includes the following properties: static data interface 1128 is configured to provide a per data source interface to consumer data (e.g., targeting info vs. purchase history); static data interface 1128 is configured to support reading per source data from a wrapper JSON object (this may be used to pre-join data for efficient scanning across large chunks of data in MapReduce (one example of MapReduce is Hadoop M/R, which is maintained by the Apache Software Foundation http://hadoop.apache.org/mapreduce/); and static data interface 1128 is configured to support having individual lookups for certain pieces of data for real time calculation.

Figure 8:
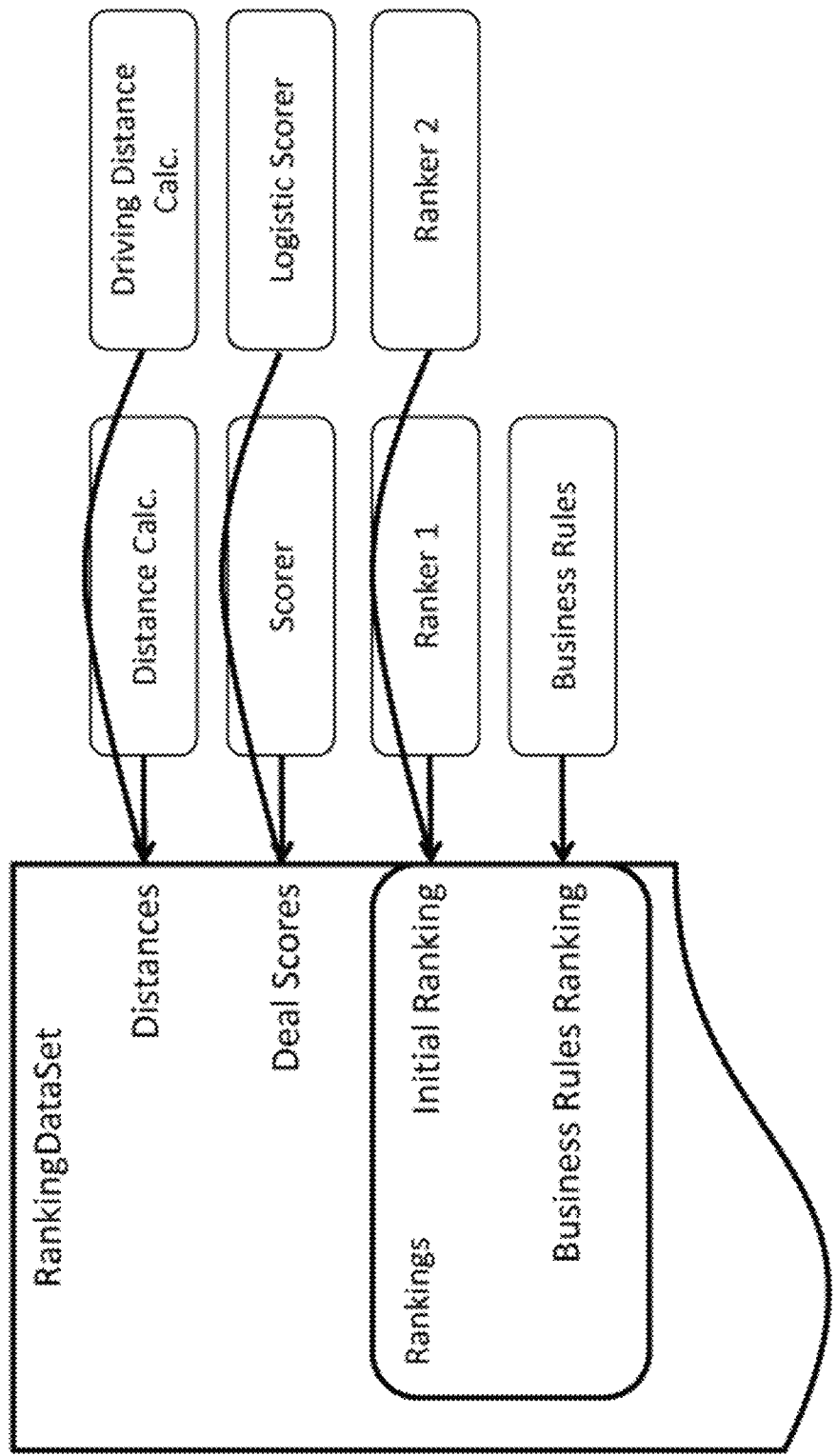
FIG. 8 is an example of a RankingDataSet object.
Figure 9:
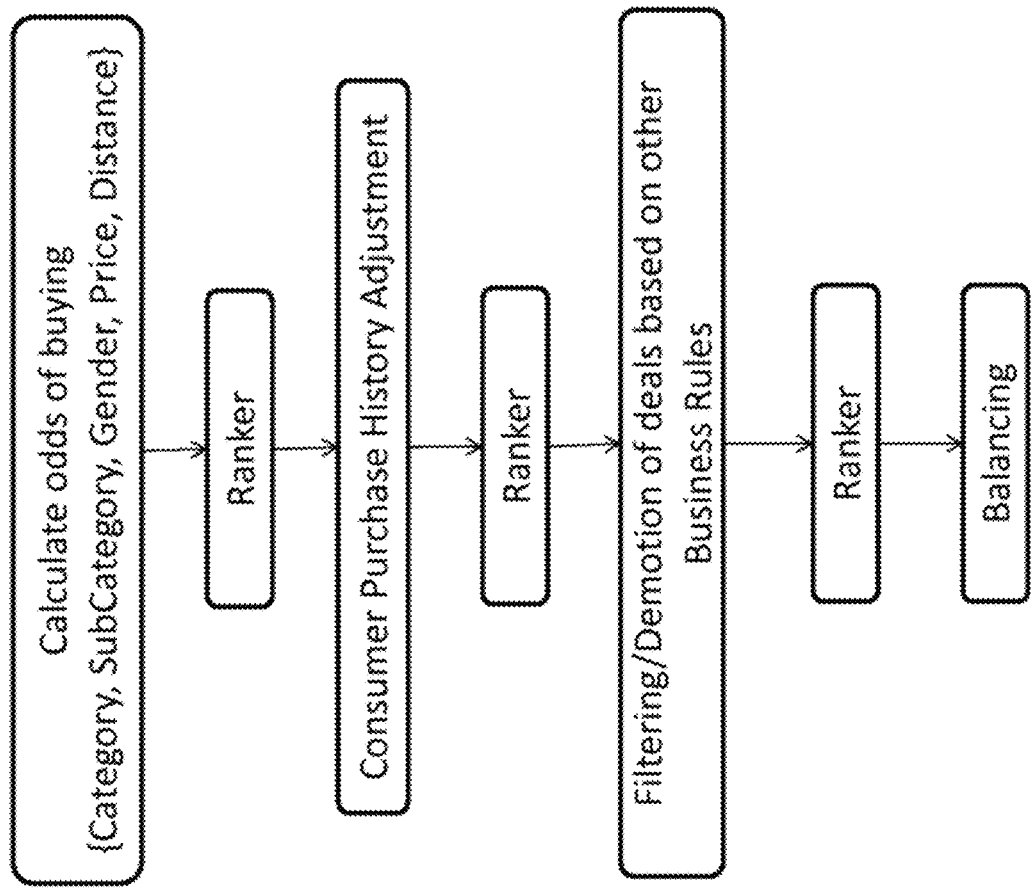
FIG. 9 shows an example of a logic flow of different stages of the deal analytical engine in the deal allocation platform.

As discussed above, the deal analytical engine 1100 is configured to rank deals for consumers. The deal analytical engine 1100 may be composed of one or a multitude of methodologies in which to rank the deals. One, some, or all of the methodologies in the deal analytical engine 1100 may be composed of multiple stages of operation. FIG. 9 illustrates an example of the logic flow of different stages of operation in one methodology of the deal analytical engine 1100. In one aspect of the invention, one, some, or all of the stages of operation within a methodology of the deal analytical engine may be interchangeable. A data set object, such as the RankingDataSet object depicted in FIG. 8, may be used to enable interchangeability of the stages. The data set object may include consumer data and/or deal data that is used by the different stages in the methodology. In particular, the different stages in the methodology may access the data set object, analyze a part of the data within the data set object (such as the consumer data and/or deal data), and update at least a part of the data set object (such as updating a ranking of deals for the particular consumer). In this way, the data set object may be considered a snapshot of the ranking at the different stages of the methodology (including initial ranking, business rules ranking, etc.). In one embodiment, the snapshot capability is made possible because the RankingDataSet object is treated as an append-only record: data that is written to the RankingDataSet object is not modified, but new rankings can be appended and fetched as the most recent ranking. Further, the data set object may be configured to store data from the various stages, such as the ranking of the deals at the various stages. So that, the ranking of the deals through the various stages of the methodology may be examined.

The data set object enables a standardized way in which to design a stage for use in the methodology of ranking deals. For example, one stage may include calculating odds of buying, which may be based on one or more factors, such as the category/subcategory and price of the deal, the gender of the consumer, and the distance of the consumer from the deal. The stage may calculate the distance using one or more algorithms and update the data set object. As shown in FIG. 8, the distance may be calculated in multiple ways, such as a point-to-point distance calculation or a driving distance calculation. Further, another stage, ranker, may rank the deals at various points in the methodology. In this regard, the platform enables experimentation. Consumers may be selected into experiments, with the different experiments being represented as different configurable stages (one example of a series of stages is illustrated in FIG. 9). Thus, different experiments may be tested more easily (such as rearranging different stages or making changes within a stage).

As discussed above, the data interface 1126 enables abstraction of the data from the deal analytical engine 1100. The data set object enables a different type of abstraction, namely in the order the stages of a methodology. The stages may be designed to access the data set object. So that, one, some or all of the stages may be placed in different orders or replaced by different stages. Stages may also be passed parameters so that they may be configured independently, and this configuration may differ between ranking methodologies. In this way, different methodologies may be created by swapping the order of various stages.

The deal allocation platform may be used as an experimentation platform in which the different methodologies may experiment different ways in which to rank deals. For example, the deal analytical engine 1100 may be configured with one or multiple experiments that include different orders and/or different stages. The experiments may be used to replace or modify an existing methodology. Alternatively, different methodologies may be used for different contexts, such as a batch methodology for batch processing of e-mails, a real-time methodology for real-processing of deal requests. Thus, the results of the different experiments may be examined across different contexts, such as analyzing experimental data for the batch methodology in terms of whether to modify the real-time methodology.

Figure 10:
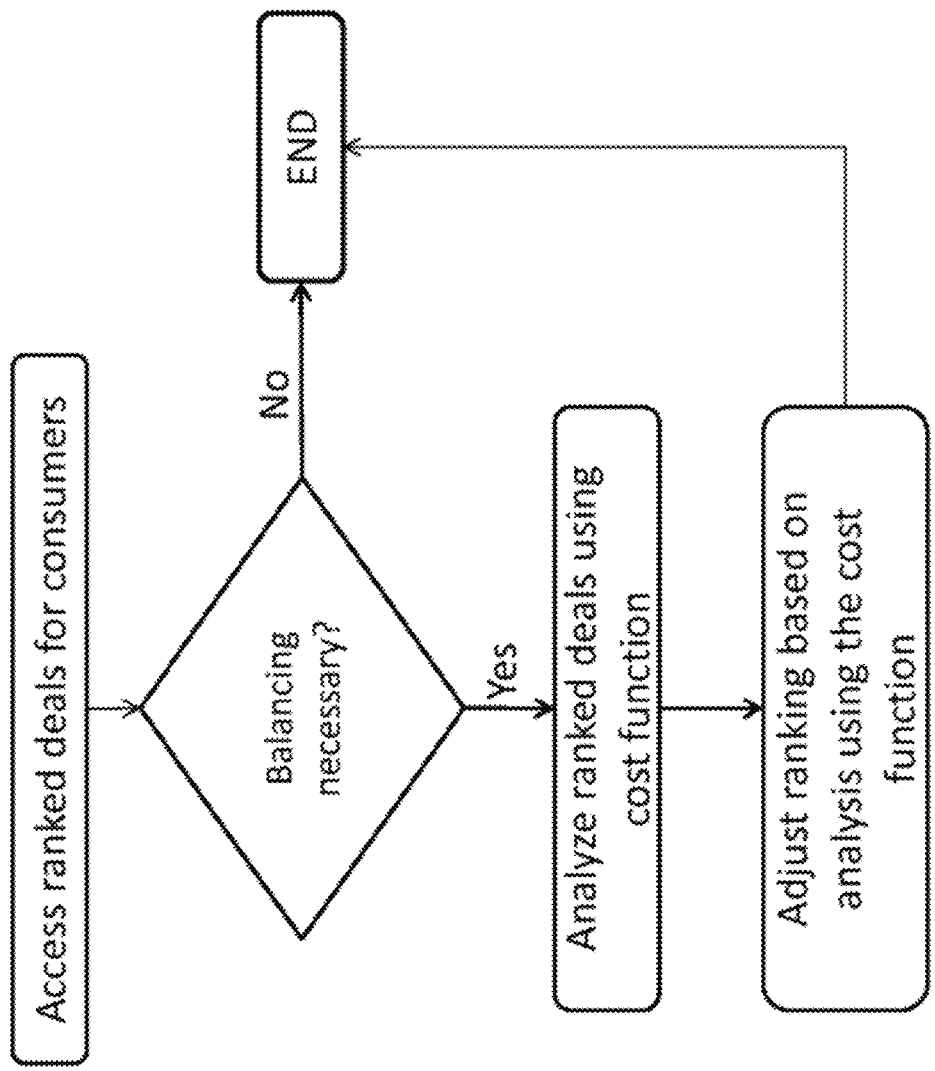
FIG. 10 shows a logic flow for balancing deals using the deal allocation platform.

As shown in FIG. 9, one stage of the methodology may include balancing. FIG. 10 shows a logic flow for balancing deals using the deal allocation platform. Balancing may include adjusting the number of consumers that are shown or offered a deal. A particular deal may have a minimum and/or a maximum number of consumers that are shown or offered a deal. In the event that the ranking algorithm produces fewer than the minimum number of consumers or greater than the maximum number of consumers, a balancing stage may be included.

In one aspect, the balancing stage uses a cost function in order to determine which consumers to reallocate (such as reallocating consumers to the particular deal in the event that the ranking algorithm produces fewer than the minimum number of consumers or reallocating consumers from the particular deal to another deal(s) in the event that the ranking algorithm produces greater than the maximum number of consumers).

The cost function may analyze the output of the ranking algorithm in order to determine whether to reallocate a consumer. In this way, it is not necessary to re-score the deals in order to perform balancing. Rather, balancing in the present embodiment examines a group (or groups) of consumers in the aggregate in order to better approach a global optimization (instead of examining customers from an individual standpoint). In particular, balancing uses a cost function to examine the cost of the reallocation of consumers, and attempts, using the cost function, to reduce or minimize the cost of reallocation of consumers. The cost function may be used to examine one or more aspects of the "cost" of reallocating customers into the particular deal or away from the particular deal. Examples of aspects include, but are not limited to: change in expectation of revenue due to reallocation and change in expectation of acceptance of the deal due to reallocation.

One specific example of a cost function is a delta function, which calculates the difference between a first ranking and an n-th ranking where n>1. In particular, the delta function may calculate the difference between the first ranking and a second ranking (such as a difference between a top ranking and a second-to-top ranking). For example, in the event that the ranking algorithm produces greater than the maximum number of consumers for the particular deal, the deal analytical engine 1100 will assign the particular deal as the top ranked deal for certain consumers. In this example, the cost function due to reallocation may be the difference between the score for the top ranked particular deal and the score for a second-to-top ranked other deal (the cost of moving from the top ranked deal to the other deal). As another example, in the event that the ranking algorithm produces less than the minimum number of consumers for the particular deal, one or more customers are assigned to the particular deal (even though the top ranked deal was not the particular deal). In this example, the cost function may be the difference between the score of the top ranked deal and the score of the particular deal.

An additional level of complexity arises when multiple groupings of consumers are used. As discussed above, the balancing stage uses a cost function in order to determine which consumers to reallocate. In one example, the consumers may be reallocated from a single group. For instance, the ranking methodology may examine a single group of consumers in which to determine which deals to assign so that the reallocation examines consumers within that single group. Alternatively, multiple groups of consumers may be used. For example, the deal allocation engine 1100 may include multiple ranking methodologies, with each of the multiple ranking methodologies examining whether to assign consumers within respective groups of consumers to one of multiple deals. In particular, a first ranking methodology may determine whether to assign one or more consumers in a first set of consumers to the particular deal, a second ranking methodology may determine whether to assign one or more consumers in a second set of consumers to the particular deal, and so on. The total of consumers assigned to the particular deal may be determined by summing the consumers assigned from each of the multiple ranking methodologies. In the instance of multiple groups of consumers, the balancing stage may select one or more groups to reallocate consumers, and how many consumers to reallocate from the selected groups.

The following is an example of an initial ranking of consumers, and subsequent balancing. Suppose there are Deal A, Deal B, and Deal C, with the ranking methodology assigning 30K, 40K, and 50K consumers respectively. In the present example, this means that, absent balancing, the methodology assigns 30K consumers to receive Deal A as their featured deal. In other words, the deal analytical engine 1100 analyzed one or more groups of consumers and determined that Deal A was ranked as the top slot of rankings for 30K consumers. This top slot may be termed the 'featured deal'. As discussed above, there are times when the total number of consumers ranked according to the deal analytical engine 1100 is lower or higher than desired so that the aim of balancing is to adjust those placements in a way that has minimal damage.

In the example presented, suppose for business reasons, it is decided that 40K consumers should receive Deal A as a featured deal. This means, in turn, that the balancing stage reassigns 10K consumers who are currently assigned, absent balancing, to receive Deal B or Deal C. Thus, the reassigning is performed by ordering consumers at the cost of swapping their existing featured deal with Deal A. The balancing stage may perform the reassigning for one or multiple deals simultaneously. Needless to say, the balancing stage may increase the number of users for Deal A to 40K, while simultaneously decreasing the users for Deal B and/or Deal C.

As discussed above, the consumers may be selected from a single group. Alternatively, the consumers may be selected from multiple groups. The balancing stage may select which of the multiple groups to perform reallocation, and how many consumers to reallocate within the selected multiple groups. The balancing stage may redistribute the deficiency (either overage or underage) proportionately amongst the multiple groups or redistribute balanced placements and discrepancy proportionally.

In an example where four experiments are run with four respective groups of consumers, the number of consumers assigned to Deal A from each of the four experiments is as follows: 8K; 12K; 7K; and 3K (giving a total of 30K consumers assigned to Deal A absent balancing). As discussed above, it is determined that an additional 10K consumers should be assigned. The first question is to determine how to distribute the reallocation of the 10K consumers across the four groups of consumers.

In one aspect, the balancing stage may force each of the different groupings to a minimal amount of consumers or to an equal amount of consumers. In the example presented, the balancing stage may force each grouping to have a minimum of 10 k. If this is done, the total number of consumers assigned to Deal A is greater than 40K. In this approach, the number of consumers assigned to Deal A, after balancing, from each of the four experiments is as follows: 10K; 12K; 10K; and 10K (giving a total of 42K consumers assigned to Deal A).

This means that a total more than 40K of consumers are assigned to Deal A after balancing. It also means that some groups of consumers shift a higher proportion of their consumers and therefore are probably doing even higher cost swaps (e.g., group 4 reallocated 7 k consumers (from 3K to 10K) whereas group 2 reallocated no consumers).

In batch processing, the global count of which consumers are assigned to which deals (prior to balancing) may be calculated. In particular, different counters may be used to know the number currently assigned without re-scanning over all of our results before doing the balancing to determine the current placements. In the example given, 30K consumers were assigned to Deal A before balancing. In another aspect, the reallocation of consumers (10K in the example given) are then distributed across each grouping so each grouping is responsible for its current placement plus its share of the difference. In this example given, the additional 10K, spread across four groups, results in an additional 2.5 k per group so that the minimums per grouping become: group 1: 8 k+2.5 k=10.5 k; group 2: 12 k+2.5 k=14.5 k; group 3: 7 k+2.5 k=9.5 k; and group 4: 3 k+2.5 k=5.5 k.

The example given is for reallocating consumers to the particular deal in the event that the ranking algorithm produces fewer than the minimum number of consumers. Alternatively, reallocating may be performed in the event that the ranking algorithm produces greater than the maximum number of consumers for a particular deal. In this instance, the cost function may analyze the cost of reallocating a customer from the particular deal to another deal.

Figure 11A:
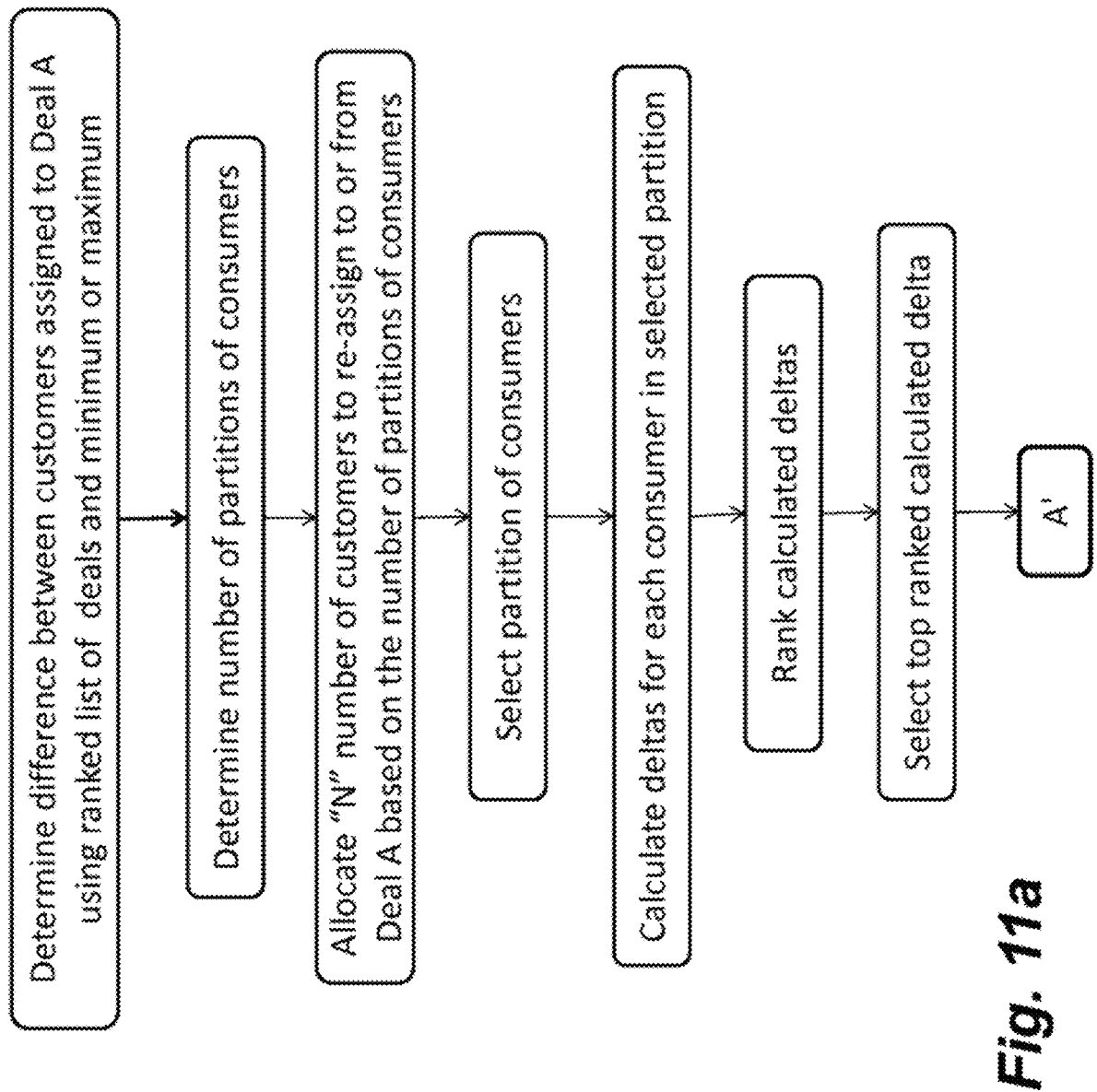
FIGS. 11a-b are an expanded block diagram of the logic flow of FIG. 10.
Figure 11B:
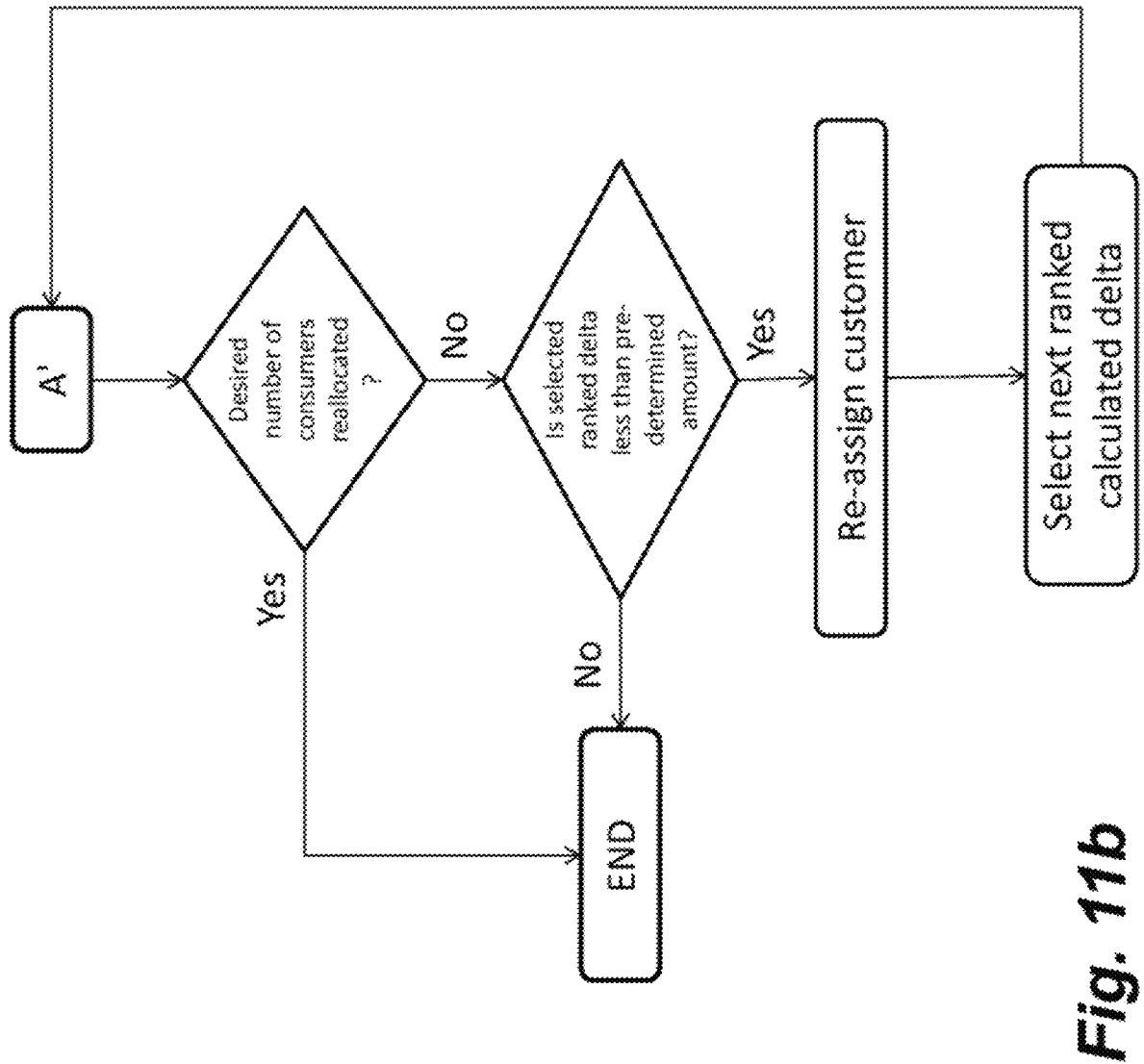

FIGS. 11a-b are an expanded block diagram of the logic flow of FIG. 10. The balancing stage attempts to find an optimal solution for multiple deals, each of which may have a one or more constraints, such as respective minimum and maximum number of customers. This type of problem can be extremely difficult to solve and, in fact, may not be solvable in any reasonable amount of time. Instead of attempting to find global optima taking into account the one or more constraints, the balancing stage may iteratively examine the cost function. For example, the balancing stage may in an ordered fashion examine the deltas. One type of order is to begin by analyzing the customer with the smallest delta and determining if the customer associated with the smallest delta is reallocated, whether it satisfies one or more of the constraints (such as whether it first satisfies one or more of the constraints for the maximum number of customers). The iteration is continued as shown in FIGS. 11a-b until the constraints are satisfied or until there are no additional customers to examine for reallocation. In one embodiment, the balancing stage attempts to satisfy the constraints associated with the maximum number of customers first (prior to satisfy the constraints associated with the minimum number of customers). Using the iteration, it enables customers to be reallocated so that the constraints may be satisfied (or may be closer to being satisfied). Further, the balancing stage may perform the balancing across multiple consumer groupings or partitions in parallel (with FIGS. 11a-b illustrating balancing of one customer grouping or partition). At an abstract level, the iterations are an attempt at an approximation (using the deltas) of an approximation (dividing the reallocations among the different partitions of customers) of a solution to a very limited set of possible inputs that are pared down due to the potential intractability of solving the problem. So that, the solution better enables satisfaction (or close to satisfaction) of the constraints of the deals.

Figure 12D:
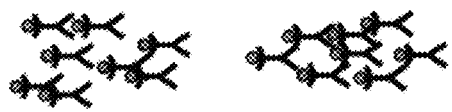
FIGS. 12a-g are illustrations of balancing basics, a MapReduce examples, and sharding.
Figure 12A:
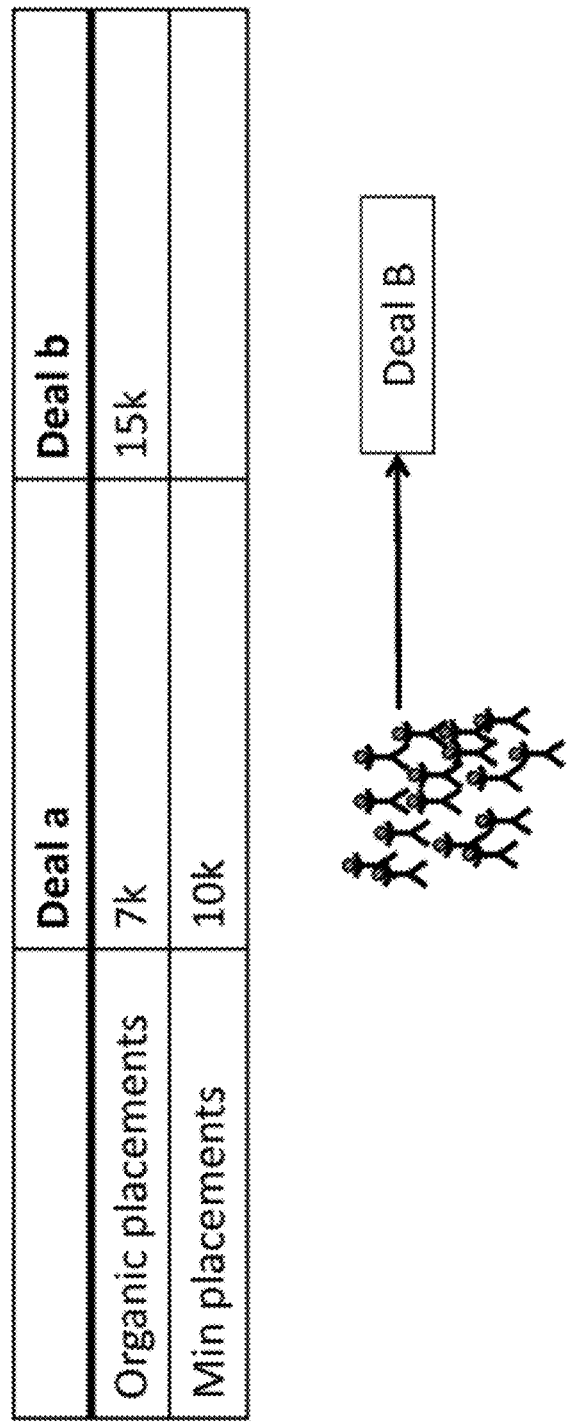
Figure 12B:
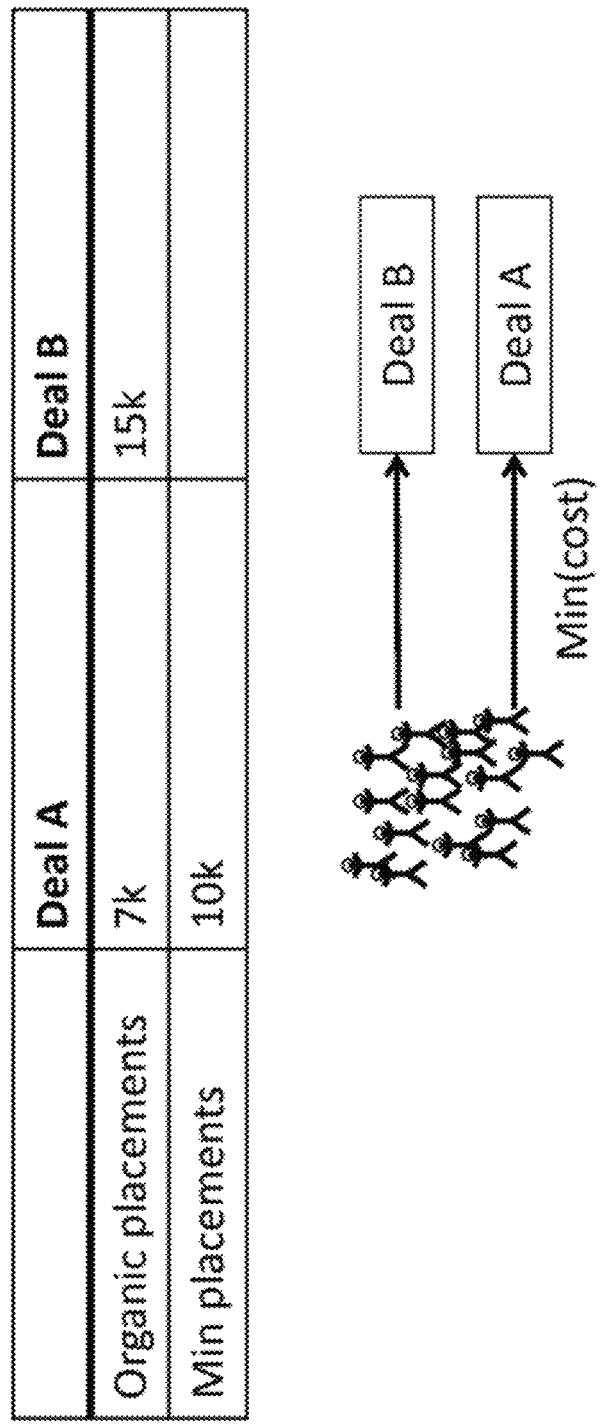
Figure 12C:
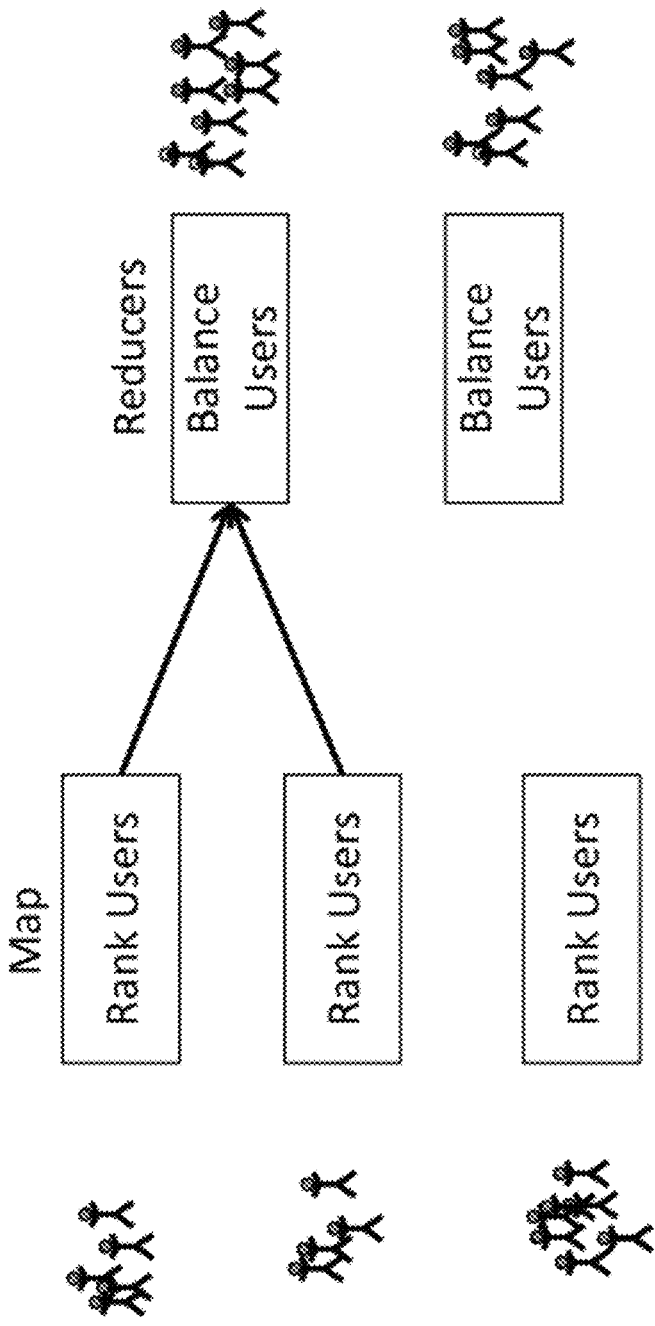
Figure 12E:
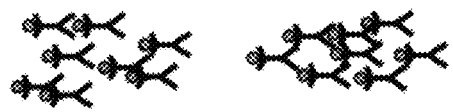
Figure 12F:
Figure 12F:
Figure 12G:
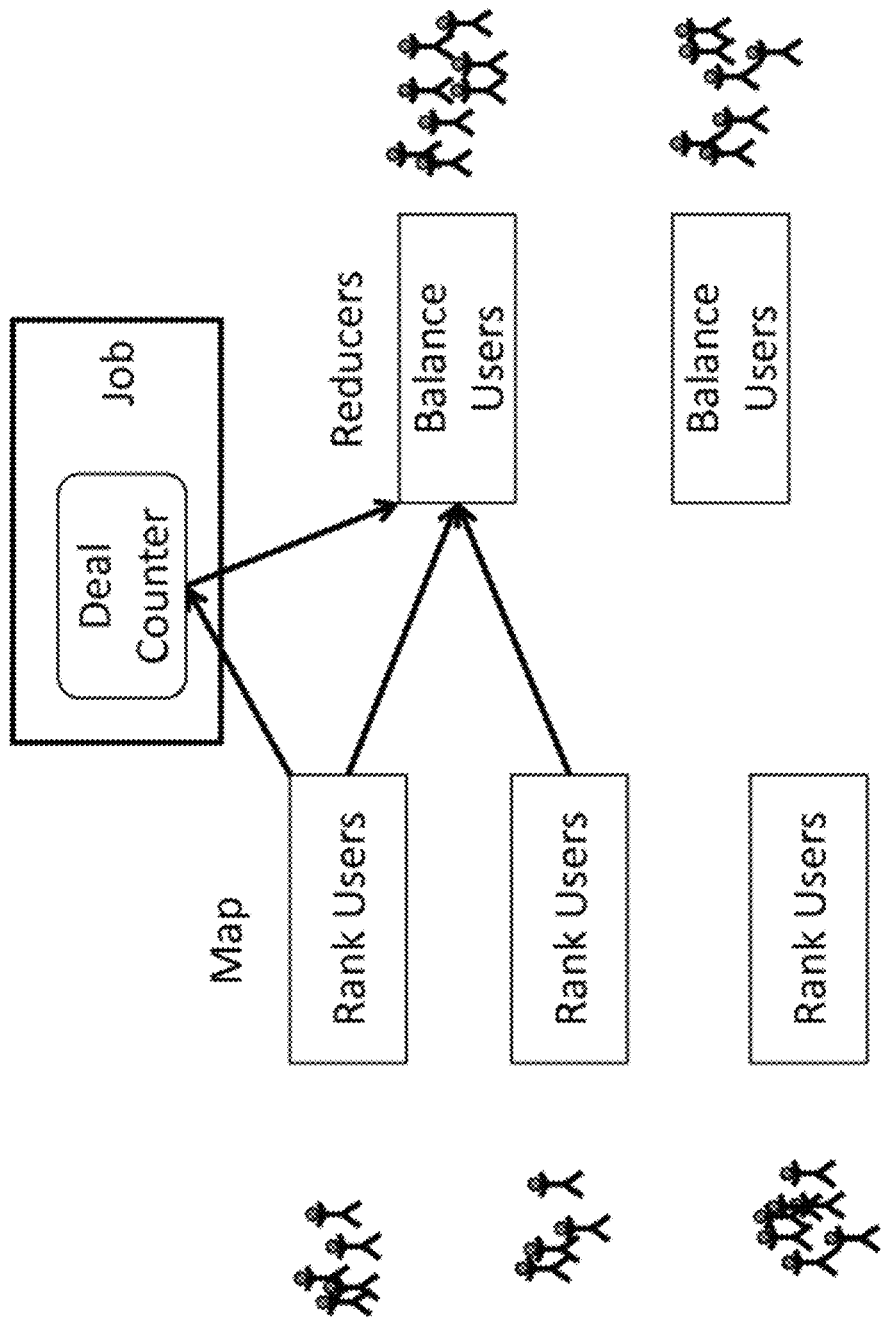

FIG. 12a is an illustration a basic balancing problem in which Deal a has 7K assigned and Deal b has 15K assigned. As shown, the minimum placement for Deal a is 10K. FIG. 12b illustrates the problem in which some of the consumers assigned to Deal b are to be assigned to Deal a with reduced or minimum cost. FIG. 12c illustrates a MapReduce example in which the Map ranks users and the reducers balance users. FIG. 12d-e illustrates sharding, which is a method of horizontal partitioning. Each individual partition can be referred to as a shard. Further, FIG. 12d-e illustrates one approach in which each shard has a minimum proportional to its size. FIG. 12f illustrates another approach to balancing. Finally, FIG. 12g illustrates another MapReduce example in which the deal counter may be used to balance users.

Figure 13:
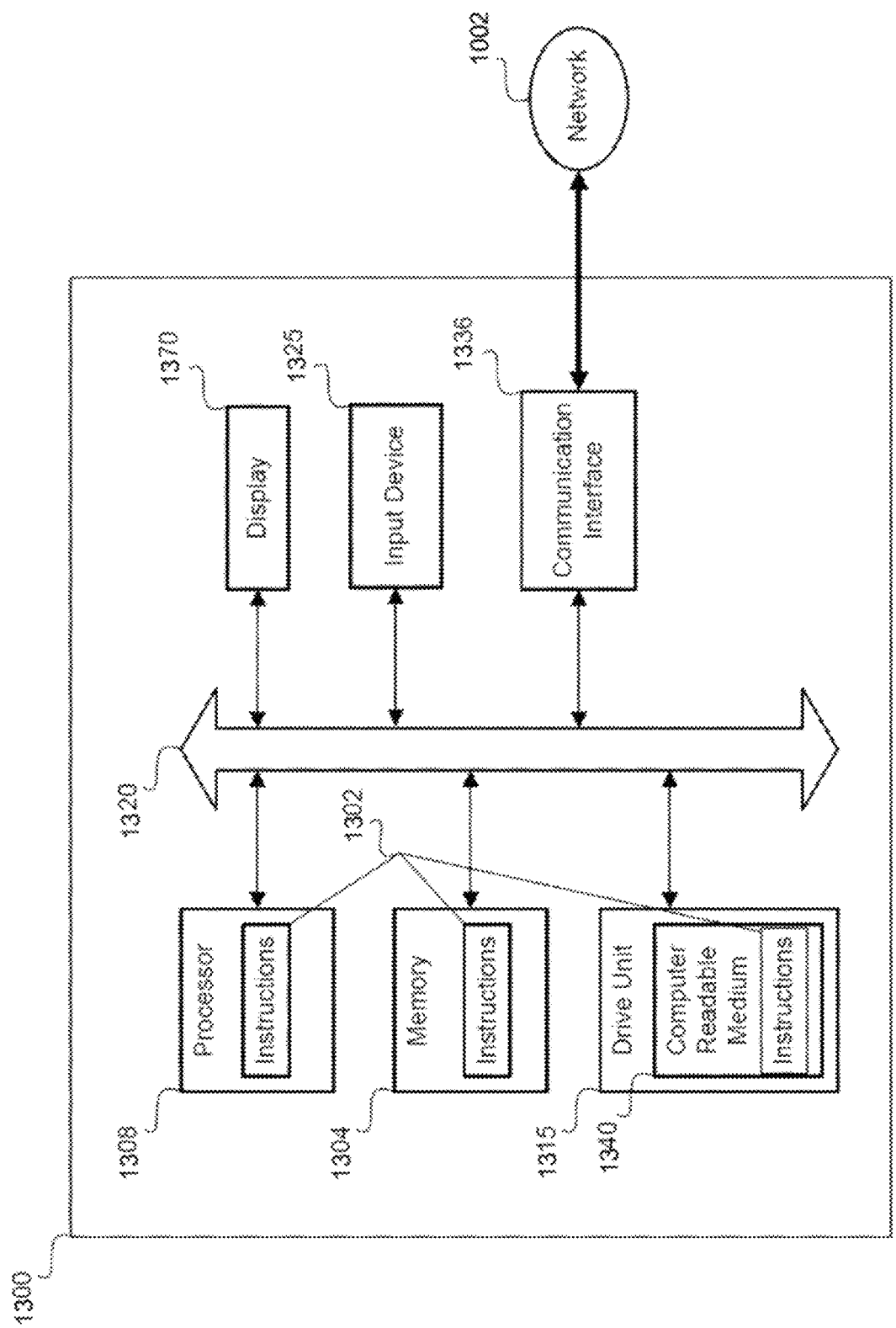
FIG. 13 is a general computer system, programmable to be a specific computer system, which may represent any of the computing devices referenced herein, such as the deal allocation platform.

FIG. 13 illustrates a general computer system 1300, programmable to be a specific computer system 1300, which may represent any server, computer or component, such as consumer 1 (1004), consumer N (1006), merchant 1 (1008), merchant M (1010), Groupon® server 1012, deal allocation platform 1014, search engine system 1016, and $3^{rd}$ party server 1018. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected, e.g., using the network 1102, to other computer systems or peripheral devices.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 1300 may include a memory 1304 on a bus 1320 for communicating information. Code operable to cause the computer system to perform any of the acts or operations described herein may be stored in the memory 1304. The memory 1304 may be a random-access memory, read-only memory, programmable memory, hard disk drive or any other type of volatile or non-volatile memory or storage device.

The computer system 1300 may include a processor 1308, such as a central processing unit (CPU) and/or a graphics processing unit (GPU). The processor 1308 may include one or more general processors, digital signal processors, application specific integrated circuits, field programmable gate arrays, digital circuits, optical circuits, analog circuits, combinations thereof, or other now known or later-developed devices for analyzing and processing data. The processor 1308 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1300 may also include a disk or optical drive unit 1315. The disk drive unit 1315 may include a computer-readable medium 1340 in which one or more sets of instructions 1302, e.g., software, can be embedded. Further, the instructions 1302 may perform one or more of the operations as described herein. The instructions 1302 may reside completely, or at least partially, within the memory 1304 and/or within the processor 1308 during execution by the computer system 1300. Accordingly, the databases 1106 may be stored in the memory 1304 and/or the disk unit 1315.

The memory 1304 and the processor 1308 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1300 may include an input device 1325, such as a keyboard or mouse, configured for a user to interact with any of the components of system 1300. It may further include a display 1370, such as a liquid crystal display (LCD), a cathode ray tube (CRT), or any other display suitable for conveying information. The display 1370 may act as an interface for the user to see the functioning of the processor 1308, or specifically as an interface with the software stored in the memory 1304 or the drive unit 1315.

The computer system 1300 may include a communication interface 1336 that enables communications via the communications network 1002. The network 1002 may include wired networks, wireless networks, or combinations thereof. The communication interface 1336 network may enable communications via any number of communication standards, such as 802.11, 802.17, 802.20, WiMax, 802.15.4, cellular telephone standards, or other communication standards, as discussed above. Just because one of these standards is listed does not mean any one is preferred as any number of these standards may never actually be adopted in a commercial product.

Further, deal allocation platform 1014, as depicted in FIG. 2, may comprise one computer system or a multitude of computer systems (each working in concert to provide the functionality described in FIG. 2). Block diagrams of different aspects of the system, including FIGS. 1 and 3-6 may be implemented using the computer functionality disclosed in FIG. 13. Further, the flow diagrams illustrated in FIGS. 9-11*b* may use computer readable instructions that are executed by one or more processors in order to implement the functionality disclosed. Finally, the displays may be output on an I/O device, such as I/O Unit 1355.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method of determining a first group of consumers to which to present, via electronic communication configured to display on a user device, a first deal via a reallocation process performed in real-time, such that the first deal is presented to no less than a minimum number of consumers and no more than a maximum number of consumers, the method comprising:
    defining, via a processor, a set of consumers, the set of consumers being defined based on requests for display of the first deal;
    receiving, via the processor and from a data interface, consumer data units associated with each consumer of the set of consumers, wherein the consumer data units each comprise constituent data from disparate sources, and wherein the data interface is configured to assemble the constituent data into the consumer data units such that the disparate sources of the constituent data are hidden from the processor;
    identifying, via the processor and based on the consumer data units, a first group of consumers that is most likely to purchase the first deal from a deal set comprised of at least the first deal and a second deal;
    identifying, via the processor, from the set of consumers, a second group of consumers that is most likely to purchase the second deal,
    wherein the first deal is associated with a minimum number, the minimum number being a minimum number of consumers to which the first deal is to be presented;
    determining, via the processor, a shortage of the first group of consumers compared to the minimum number of consumers to which the first deal is to be presented;
    determining, via the processor, and based only on the shortage of the first group of consumers compared to the minimum number of consumers to which the first deal is presented, that one or more consumers from the second group of consumers are to be reallocated to the first group of consumers;
    iteratively analyzing, on a consumer-by-consumer basis, starting with a particular consumer having a smallest difference between an expected revenue upon an acceptance of the second deal versus an acceptance of the first deal, costs associated with reallocating consumers from the second group of consumers to the first group of consumers, to correct for the shortage of the first group of consumers compared to the minimum number of consumers to which the first deal is presented;
    determining a change in expectation of revenue due to a reallocation of the particular consumer from receiving the second deal to receiving the first deal;
    calculating an aggregate cost of reallocation by balancing the change in expectation of revenue due to the reallocation of the particular consumer from receiving the second deal to receiving the first deal until a determination that, upon reallocation of the particular consumer, the shortage no longer exists;
    finalizing, upon a determination of which one or more consumers are to be reallocated based on the aggregate cost of reallocation, the first group of consumers and the second group of consumers; and
    presenting, via a display, the first deal to the first group of consumers and the second deal to the second group of consumers.

2. The method of claim 1,
    wherein the first deal is associated with a maximum number, the maximum number being a maximum number of consumers to which the first deal is to be presented.

3. The method of claim 2, further comprising: determining, via the processor, and based only on a surplus of the first group of consumers compared to the maximum number of consumers to which the first deal is presented, that one or more consumers are to be reallocated from the first group of consumers to the second group of consumers.

4. The method of claim 3, further comprising:
    iteratively analyzing, on a consumer-by-consumer basis, starting with a particular consumer having a smallest difference between an expected revenue upon an acceptance of the first deal versus an acceptance of the second deal, costs associated with reallocating consumers from the first group of consumers to the second group of consumers, to correct for the surplus of the first group of consumers compared to the maximum number of consumers to which the first deal is presented.

5. The method of claim 4, further comprising:
    determining a second change in expectation of revenue due to a reallocation of the particular consumer from receiving the first deal to receiving the second deal.

6. The method of claim 5, further comprising:
    calculating a second aggregate cost of reallocation by balancing the change in expectation of revenue due to the reallocation of the particular consumer from receiving the first deal to receiving the second deal until a determination that, upon reallocation of the particular consumer, the surplus no longer exists.

7. The method of claim 1,
    wherein the second deal is associated with a minimum number, the minimum number being a minimum number of consumers to which the second deal is to be presented,
    the method further comprising:
        determining, via the processor, a shortage of the second group of consumers compared to the minimum number of consumers to which the second deal is presented;
        determining, via the processor, and based only on the shortage of the second group of consumers compared to the minimum number of consumers to which the second deal is presented, that one or more consumers from the first group of consumers are to be reallocated to the second group of consumers;
        iteratively analyzing, on a consumer-by-consumer basis, starting with a particular consumer having a smallest difference between an expected revenue upon an acceptance of the first deal versus an acceptance of the second deal, costs associated with reallocating consumers from the first group of consumers to the second group of consumers, to correct for the shortage of the second group of consumers compared to the minimum number of consumers to which the second deal is to be presented;
        determining a change in expectation of revenue due to a reallocation of the particular consumer from receiving the first deal to receiving the second deal; and
        calculating a third aggregate cost of reallocation by balancing the change in expectation of revenue due to the reallocation of the particular consumer from receiving the first deal to receiving the second deal until a determination that, upon reallocation of the particular consumer, the shortage of the second group of consumers compared to the minimum number of consumers to which the second deal is to be presented no longer exists.

8. A computer program product configured for determining a first group of consumers to which to present, via electronic communication configured to display on a user device, a first deal via a reallocation process performed in real-time, such that the first deal is presented to no less than a minimum number of consumers and no more than a maximum number of consumers, the computer program product comprising at least one non-transitory computer-readable storage medium having computer-executable program code instructions stored therein, the computer-executable program code instructions comprising program code instructions for:

defining, by a processor, a set of consumers, the set of consumers being defined based on requests for display of the first deal;

receiving, by the processor, consumer data units associated with each consumer of the set of consumers, wherein the consumer data units each comprise constituent data from disparate sources, and wherein the constituent data is assembled into the consumer data units such that the disparate sources of the constituent data are hidden from the processor;

identifying, via the processor and based on the consumer data units, a first group of consumers that is most likely to purchase the first deal from a deal set comprised of at least the first deal and a second deal;

identifying, via the processor, from the set of consumers, a second group of consumers that is most likely to purchase the second deal, wherein the first deal is associated with a minimum number, the minimum number being a minimum number of consumers to which the first deal is to be presented;

determining, via the processor, a shortage of the first group of consumers compared to the minimum number of consumers to which the first deal is to be presented;

determining, via the processor, and based only on the shortage of the first group of consumers compared to the minimum number of consumers to which the first deal is to be presented, that that one or more consumers from the second group of consumers are to be reallocated to the first group of consumers;

iteratively analyzing, on a consumer-by-consumer basis, starting with a particular consumer having a smallest difference between an expected revenue upon an acceptance of the second deal versus an acceptance of the first deal, costs associated with reallocating consumers from the second group of consumers to the first group of consumers, to correct for the shortage of the first group of consumers compared to the minimum number of consumers to which the first deal is to be presented;

determining a change in expectation of revenue due to a reallocation of the particular consumer from receiving the second deal to receiving the first deal;

calculating an aggregate cost of reallocation by balancing the change in expectation of revenue due to the reallocation of the particular consumer from receiving the second deal to receiving the first deal until a determination that, upon reallocation of the particular consumer, the shortage no longer exists;

finalizing, upon a determination of which one or more consumers are to be reallocated based on the aggregate cost of reallocation, the first group of consumers and the second group of consumers; and presenting, via a display, the first deal to the first group of consumers and the second deal to the second group of consumers.

9. The computer program product of claim 8,
wherein the first deal is associated with a maximum number, the maximum number being a maximum number of consumers to which the first deal is to be presented.

10. The computer program product of claim 9, wherein the computer-executable program code instructions further comprise program code instructions for:

determining, via the processor, and based only on a surplus of the first group of consumers compared to the maximum number of consumers to which the first deal is to be presented, that one or more consumers are to be reallocated from the first group of consumers to the second group of consumers.

11. The computer program product of claim 10, wherein the computer-executable program code instructions further comprise program code instructions for:

iteratively analyzing, on a consumer-by-consumer basis, starting with a particular consumer having a smallest difference between an expected revenue upon an acceptance of the first deal versus an acceptance of the second deal, costs associated with reallocating consumers from the first group of consumers to the second group of consumers, to correct for the surplus of the first group of consumers compared to the maximum number of consumers to which the first deal is to be presented.

12. The computer program product of claim 11, wherein the computer-executable program code instructions further comprise program code instructions for:

determining a second change in expectation of revenue due to a reallocation of the particular consumer from receiving the first deal to receiving the second deal.

13. The computer program product of claim 12, wherein the computer-executable program code instructions further comprise program code instructions for:

calculating a second aggregate cost of reallocation by balancing the change in expectation of revenue due to the reallocation of the particular consumer from receiving the first deal to receiving the second deal until a determination that, upon reallocation of the particular consumer, the surplus no longer exists.

14. The computer program product of claim 1,
wherein the second deal is associated with a minimum number, the minimum number being a minimum number of consumers to which the second deal is to be presented, wherein the computer-executable program code instructions further comprise program code instructions for:

determining, via the processor, a shortage of the second group of consumers compared to the minimum number of consumers to which the second deal is to be presented;

determining, via the processor, and based only on the shortage of the second group of consumers compared to the minimum number of consumers to which the second deal is presented, that one or more consumers from the first group of consumers are to be reallocated to the second group of consumers;

iteratively analyzing, on a consumer-by-consumer basis, starting with a particular consumer having the smallest difference between an expected revenue upon an acceptance of the first deal versus an acceptance of the second deal, costs associated with reallocating consumers from the first group of consumers to the second group of consumers, to correct for the shortage of the second group of consumers compared to the minimum number of consumers to which the second deal is presented;

determining a change in expectation of revenue due to a reallocation of the particular consumer from receiving the first deal to receiving the second deal; and calculating a third aggregate cost of reallocation by balancing the change in expectation of revenue due to the reallocation of the particular consumer from receiving the first deal to receiving the second deal until a determination that, upon reallocation of the particular consumer, the shortage of the second group of consumers compared to the minimum number of consumers to which the second deal is to be presented no longer exists.

15. An apparatus configured for determining a first group of consumers to which to present, via electronic communication configured to display on a user device, a first deal via a reallocation process performed in real-time, such that the first deal is presented to no less than a minimum number of consumers and no more than a maximum number of consumers, the apparatus comprising at least one processor and at least one memory including computer program code, the at least one memory and the computer program code configured to, with the processor, cause the apparatus to at least:

define, via the processor, a set of consumers, the set of consumers being defined based on requests for display of the first deal;

receiving, via the processor and from a data interface, consumer data units associated with each consumer of the set of consumers, wherein the consumer data units each comprise constituent data from disparate sources, and wherein the data interface is configured to assemble the constituent data into the consumer data units such that the disparate sources of the constituent data are hidden from the processor;

identify, via the processor and based on the consumer data units, a first group of consumers that is most likely to purchase the first deal from a set comprised of at least the first deal and a second deal;

identify, via the processor, from the set of consumers, a second group of consumers that is most likely to purchase the second deal, wherein the first deal is associated with a minimum number, the minimum number being a minimum number of consumers to which the first deal is presented;

determine, via the processor, a shortage of the first group of consumers compared to the minimum number of consumers to which the first deal is presented;

determine, via the processor, and based only on the shortage of the first group of consumers compared to the minimum number of consumers to which the first deal is presented, that that one or more consumers from the second group of consumers are to be reallocated to the first group of consumers;

iteratively analyze, on a consumer-by-consumer basis, starting with a particular consumer having a smallest difference between an expected revenue upon an acceptance of the second deal versus an acceptance of the first deal, costs associated with reallocating consumers from the second group of consumers to the first group of consumers, to correct for the shortage of the first group of consumers compared to the minimum number of consumers to which the first deal is presented;

determine a change in expectation of revenue due to a reallocation of the particular consumer from receiving the second deal to receiving the first deal;

calculate an aggregate cost of reallocation by balancing the change in expectation of revenue due to the reallocation of the particular consumer from receiving the second deal to receiving the first deal until a determination that, upon reallocation of the particular consumer, the shortage no longer exists;

finalize, upon a determination of which one or more consumers are to be reallocated based on the aggregate cost of reallocation, the first group of consumers and the second group of consumers; and present, via a display, the first deal to the first group of consumers and the second deal to the second group of consumers.

16. The apparatus of claim 15,
wherein the first deal is associated with a maximum number, the maximum number being a maximum number of consumers to which the first deal is presented.

17. The apparatus of claim 16, wherein the at least one memory and the computer program code are further configured to, with the processor, cause the apparatus to: determine, via the processor, and based only on a surplus of the first group of consumers compared to the maximum number of consumers to which the first deal is presented, that one or more consumers are to be reallocated from the first group of consumers to the second group of consumers.

18. The apparatus of claim 17, wherein the at least one memory and the computer program code are further configured to, with the processor, cause the apparatus to:

iteratively analyze, on a consumer-by-consumer basis, starting with a particular consumer having a smallest difference between an expected revenue upon an acceptance of the first deal versus an acceptance of the second deal, costs associated with reallocating consumers from the first group of consumers to the second group of consumers, to correct for the surplus of the first group of consumers compared to the maximum number of consumers to which the first deal is presented.

19. The apparatus of claim 18, wherein the at least one memory and the computer program code are further configured to, with the processor, cause the apparatus to:

determine a second change in expectation of revenue due to a reallocation of the particular consumer from receiving the first deal to receiving the second deal.

20. The apparatus of claim 19, wherein the at least one memory and the computer program code are further configured to, with the processor, cause the apparatus to:

calculate a second aggregate cost of reallocation by balancing the change in expectation of revenue due to the reallocation of the particular consumer from receiving the first deal to receiving the second deal until a determination that, upon reallocation of the particular consumer, the surplus no longer exists.

21. The apparatus of claim 15,
wherein the second deal is associated with a minimum number, the minimum number being a minimum number of consumers to which the second deal is presented, wherein the at least one memory and the computer program code are further configured to, with the processor, cause the apparatus to:

determine, via the processor, a shortage of the second group of consumers compared to the minimum number of consumers to which the second deal is presented;

determine, via the processor, and based only on the shortage of the second group of consumers compared to the minimum number of consumers to which the second deal is presented, that one or more consumers from the first group of consumers are to be reallocated to the second group of consumers;

iteratively analyze, on a consumer-by-consumer basis, starting with a particular consumer having the smallest difference between an expected revenue upon an acceptance of the first deal versus an acceptance of the second deal, costs associated with reallocating consumers from the first group of consumers to the second group of consumers, to correct for the shortage of the second group of consumers compared to the minimum number of consumers to which the second deal is presented;

determine a change in expectation of revenue due to a reallocation of the particular consumer from receiving the first deal to receiving the second deal; and calculate a third aggregate cost of reallocation by balancing the change in expectation of revenue due to the reallocation of the particular consumer from receiving the first deal to receiving the second deal until a determination that, upon reallocation of the particular consumer, the shortage of the second group of consumers compared to the minimum number of consumers to which the second deal is presented no longer exists.

* * * * *